United States Patent
Aoyagi et al.

(10) Patent No.: US 6,978,665 B2
(45) Date of Patent: Dec. 27, 2005

(54) HYDROGEN SUPPLY APPARATUS AND HYDROGEN SUPPLY METHOD FOR MEASURING FUEL CONSUMPTION OF HYDROGEN FUEL VEHICLE

(75) Inventors: Satoshi Aoyagi, Kawachi-gun (JP); Osamu Sukagawa, Utsunomiya (JP); Takuya Shirasaka, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 10/775,480

(22) Filed: Feb. 10, 2004

(65) Prior Publication Data

US 2004/0221819 A1    Nov. 11, 2004

(30) Foreign Application Priority Data

Feb. 14, 2003   (JP)   ............... 2003-036689

(51) Int. Cl.⁷ ........................................... G01M 15/00
(52) U.S. Cl. .................... 73/113; 73/116; 73/117.1; 180/65.3; 429/90
(58) Field of Search ................. 73/112–114, 116, 73/117.2, 117.3, 118.1; 429/90–94, 22, 25; 180/65.3

(56) References Cited

U.S. PATENT DOCUMENTS 6,908,700 B2 *   6/2005  Iio  ............................... 429/17

* cited by examiner

Primary Examiner—Edward Lefkowitz
Assistant Examiner—Jermaine Jenkins
(74) Attorney, Agent, or Firm—Fish & Richardson P.C.

(57) ABSTRACT

To reduce errors of measurement of fuel consumption resulting from air remaining in piping of a hydrogen supply apparatus, a hydrogen supply method for measuring fuel consumption of a hydrogen fuel vehicle comprises; a step (S02) of prior to supplying hydrogen from a measurement hydrogen tank to the hydrogen fuel vehicle, supplying hydrogen from a dummy hydrogen tank to hydrogen supply piping connecting the measurement hydrogen tank and the hydrogen fuel vehicle, to purge air in the hydrogen supply piping, and a step (S03) of after filling of the hydrogen supply piping with hydrogen from the dummy hydrogen tank, supplying hydrogen from the measurement hydrogen tank to the hydrogen fuel vehicle via the hydrogen supply piping.

13 Claims, 16 Drawing Sheets

HYDROGEN SUPPLY APPARATUS AND HYDROGEN SUPPLY METHOD FOR MEASURING FUEL CONSUMPTION OF HYDROGEN FUEL VEHICLE

BACKGROUND OF THE INVENTION

1. Field of the Invention

The present invention relates to a hydrogen supply apparatus and a hydrogen supply method used when measuring fuel consumption of a hydrogen fuel vehicle.

2. Description of the Related Art

In recent years hydrogen has become the focus of attention as a clean fuel without discharge of atmospheric pollutants. Vehicles obtaining their driving force from hydrogen such as fuel cell vehicles provided with fuel cells, and hydrogen engine vehicles mounted with hydrogen engines, and the like, employing hydrogen as fuel are under development.

As a method for measuring fuel consumption of such vehicles employing hydrogen as fuel (hereafter referred to as "hydrogen fuel vehicles") there is the weight method.

The weight method measures the mass of hydrogen fuel directly with a scale. In practice, hydrogen is supplied from a measurement hydrogen tank to a vehicle on a chassis dynamometer, the vehicle is run on the chassis dynamometer, the mass of the hydrogen tank before and after the test is measured, and the fuel consumption is measured from the mass difference. This weight method has few factors giving rise to errors, and high accuracy of measurement can be obtained with the use of an accurate scale.

Furthermore, the flow method, the P/T method (pressure method), and the electric current method are available as other methods for measuring fuel consumption of hydrogen fuel vehicles.

The flow method constantly measures and integrates the flow of the supplied hydrogen to measure fuel consumption. The P/T method measures the pressure and temperature of the hydrogen tank used before and after the test and computes fuel consumption from gas phase equations and the like. The electric current method employs the principle that the current output from a fuel cell stack is proportional to the fuel consumption used for power generation, integrates the value detected by an ammeter, and computes the fuel consumption. These methods of measurement have a variety of problems, and generally cannot be considered superior to the weight method.

Moreover, documentation related to methods of measuring fuel consumption of hydrogen fuel vehicles, for example, non-patent document 1, is available.

[Non-patent Document 1]

E. Kuroda et al, 'An Investigation of Methods for Measuring Fuel Consumption of Direct Hydrogen Fuel Cell Vehicles', JARI Research Journal, 2002, Vol.24, No.10, pp 49–54

While the weight method provides high accuracy of measurement, the points hereunder required improvement.

When the measurement hydrogen tanks are connected to the piping for connection to the test vehicle (hydrogen fuel vehicle) while the piping contains air, hydrogen from the measurement hydrogen tanks fills the piping at the start of the test, thus drawing out hydrogen from the measurement hydrogen tanks so that hydrogen filling the piping is not consumed by the test vehicle, giving rise to an error in fuel consumption.

Furthermore, the pressure of the measurement hydrogen tanks may be reduced when hydrogen from the measurement hydrogen tanks is consumed in the test, altering the amount of hydrogen filling the piping and thus giving rise to an error in fuel consumption.

SUMMARY OF THE INVENTION

The present invention therefore provides a hydrogen supply apparatus and hydrogen supply method for measuring fuel consumption of a hydrogen fuel vehicle with high accuracy.

In order to resolve the above problems, a first aspect of the invention provides a hydrogen supply method for measuring fuel consumption of a hydrogen fuel vehicle (for example, the test vehicle V of the embodiments) comprising the steps of, prior to supplying hydrogen from a measurement hydrogen tank (for example, the measurement hydrogen tanks T2, T3, T4 and T5 of the embodiments) to the hydrogen fuel vehicle, supplying hydrogen from a dummy hydrogen tank (for example, the dummy hydrogen tank T1 of the embodiments) to hydrogen supply piping (for example, the main pipe 2 and the measurement branch pipes 5, 6, 7 and 8 of the embodiments) connecting the measurement hydrogen tank and the hydrogen fuel vehicle, to purge air in the hydrogen supply piping, and after filling of the hydrogen supply piping with hydrogen from the dummy hydrogen tank, supplying hydrogen from the measurement hydrogen tank to the hydrogen fuel vehicle via the hydrogen supply piping.

This configuration enables purging of the air remaining in the hydrogen supply piping, and filling of the hydrogen supply piping with hydrogen without the use of hydrogen from the measurement hydrogen tanks, and the use of hydrogen from the measurement hydrogen tanks solely for measurement of fuel consumption.

A second aspect of the invention provides a hydrogen supply method for measuring fuel consumption of a hydrogen fuel vehicle (for example, the test vehicle V of the embodiments) using a hydrogen supply apparatus (for example, the hydrogen supply apparatus 1 of the embodiments) with a plurality of measurement branch pipes (for example, the measurement branch pipes 5, 6, 7 and 8 of the embodiments) connected to main piping (for example, the main pipe 2 of the embodiments) connected to the hydrogen fuel vehicle, and measurement hydrogen tanks (for example, the measurement hydrogen tanks T2, T3, T4 and T5 of the embodiments) connected to each of the measurement branch pipes, comprises the steps of; prior to supply of hydrogen from the measurement hydrogen tanks to the hydrogen fuel vehicle, performing air purge processing (for example, steps S104 through S108 of the embodiments), to purge air in the main pipe and the measurement branch pipes and replace with hydrogen, the air purge processing comprising; a first step (for example, the steps S104 and S108 of the embodiments) for pressurizing the main pipe with hydrogen from a dummy hydrogen tank (for example, the dummy hydrogen tank T1 of the embodiments) with the main pipe closed off from the measurement branch pipes, a second step (for example, the steps S105 and S106 of the embodiments) for closing off the dummy hydrogen tank from the main pipe following the first step, and making the main pipe and the measurement branch pipes continuous, and mixing the hydrogen in the main pipe and the air in the measurement branch pipes, and a third step (for example, the step S107 if the embodiments) for discharging the gas mixed in the second step from the piping, and after performing the air purge processing, supplying the hydrogen from the measurement hydrogen tanks to the hydrogen fuel vehicle via the main pipe and the measurement branch pipes.

This configuration enables dilution and purging of the air in the measurement branch pipes with the hydrogen filling the main pipe without the use of hydrogen from the measurement hydrogen tanks, and multiple repetitions of the air purge processing as necessary to increase the concentration of hydrogen in the main pipe and the measurement branch pipes to a predetermined concentration, and the use of the hydrogen from the measurement hydrogen tanks solely for measurement of fuel consumption.

A third aspect of the invention provides a hydrogen supply apparatus (for example, the hydrogen supply apparatus 1 of the embodiments) for measuring fuel consumption of a hydrogen fuel vehicle (for example, the test vehicle V of the embodiments) comprising: a main pipe (for example, the main pipe 2 of the embodiments) connected to the hydrogen fuel vehicle; a measurement tank (for example, the measurement hydrogen tanks T2, T3, T4 and T5 of the embodiments) filled with hydrogen for measurement; a dummy hydrogen tank (for example, the dummy hydrogen tank T1 of the embodiments) filled with hydrogen for dummy use; a measurement branch pipe (for example, the measurement branch pipes 5, 6, 7 and 8 of the embodiments) having an opening/closing device (for example, the first valve 9A of the embodiments), which connects the main pipe and the measurement hydrogen tank, and a dummy branch pipe (for example, the dummy branch pipe 3 of the embodiments) having an opening/closing device (for example, the first valve 4A of the embodiments) which connects the main pipe and the dummy hydrogen tank.

This configuration enables the air in the main pipe and the measurement branch pipe to be purged from the piping using the hydrogen from the dummy hydrogen tank, and filling of these pipes with the hydrogen from the dummy hydrogen tank, and the use of the hydrogen from the measurement hydrogen tank solely for measurement of fuel consumption.

The fourth aspect of the invention relates to the hydrogen supply apparatus according to the third aspect, in which a plurality of measurement hydrogen tanks (for example, the measurement hydrogen tanks T2, T3, T4 and T5 of the embodiments) are provided, and the measurement hydrogen tanks are connected in parallel to the main pipe via each of the measurement branch pipes (for example, the measurement branch pipes 5, 6, 7 and 8 of the embodiments).

This configuration enables continuous supply of hydrogen to the hydrogen fuel vehicle by simply switching between the measurement hydrogen tanks, when measuring fuel consumption in different running modes (phases).

A fifth aspect of the invention relates to a hydrogen supply apparatus for measuring the fuel consumption according to the third aspect of the present invention, wherein the measurement branch pipe and the dummy branch pipe are releasably connected by a connector (for example, the connector 30 of the embodiments) fitted with an automatic open/close mechanism that automatically opens and closes when the connector is fitted or removed, which is provided therebetween to enable separation and connection as necessary.

This configuration enables ready connection and disconnection of the measurement hydrogen tanks and dummy hydrogen tank.

A sixth aspect of the invention relates to the hydrogen supply apparatus according to the third aspect of the invention, wherein a pressure regulator (for example, the pressure regulator 11 of the embodiments) is provided in the main pipe downstream of a connection located furthest downstream of the connections between the measurement branch pipes and the dummy branch pipe, and the main pipe.

This configuration enables the reduction in pressure in the piping associated with reduction in pressure in the measurement hydrogen tanks following measurement of fuel consumption, to be held solely in the main pipe and measurement branch pipes upstream of the pressure regulator, and hence a reduction in pressure in the main pipe downstream of the pressure regulator can be prevented.

A seventh aspect of the invention relates to the hydrogen supply apparatus for measuring the fuel consumption of the hydrogen fuel vehicle according to the fourth aspect of the invention, wherein a pressure regulator (for example, the pressure regulator 21 of the embodiments) is provided for each of a plurality of the measurement branch pipes.

This configuration enables the reduction in pressure in the piping associated with reduction in pressure in the measurement hydrogen tanks following measurement of fuel consumption, to be held solely in each measurement branch pipe upstream of each pressure regulator, and hence a reduction in pressure in each measurement branch pipe and the main pipe downstream of each pressure regulator can be prevented.

DETAILED DESCRIPTION OF THE INVENTION

Embodiments of the present invention are explained hereunder with reference to the drawings of FIG. 1 through FIG. 17. All of the embodiments hereunder apply to measuring fuel consumption of a fuel cell vehicle mounted with a fuel cell employing hydrogen as fuel (a hydrogen fuel vehicle).

Figure 1:
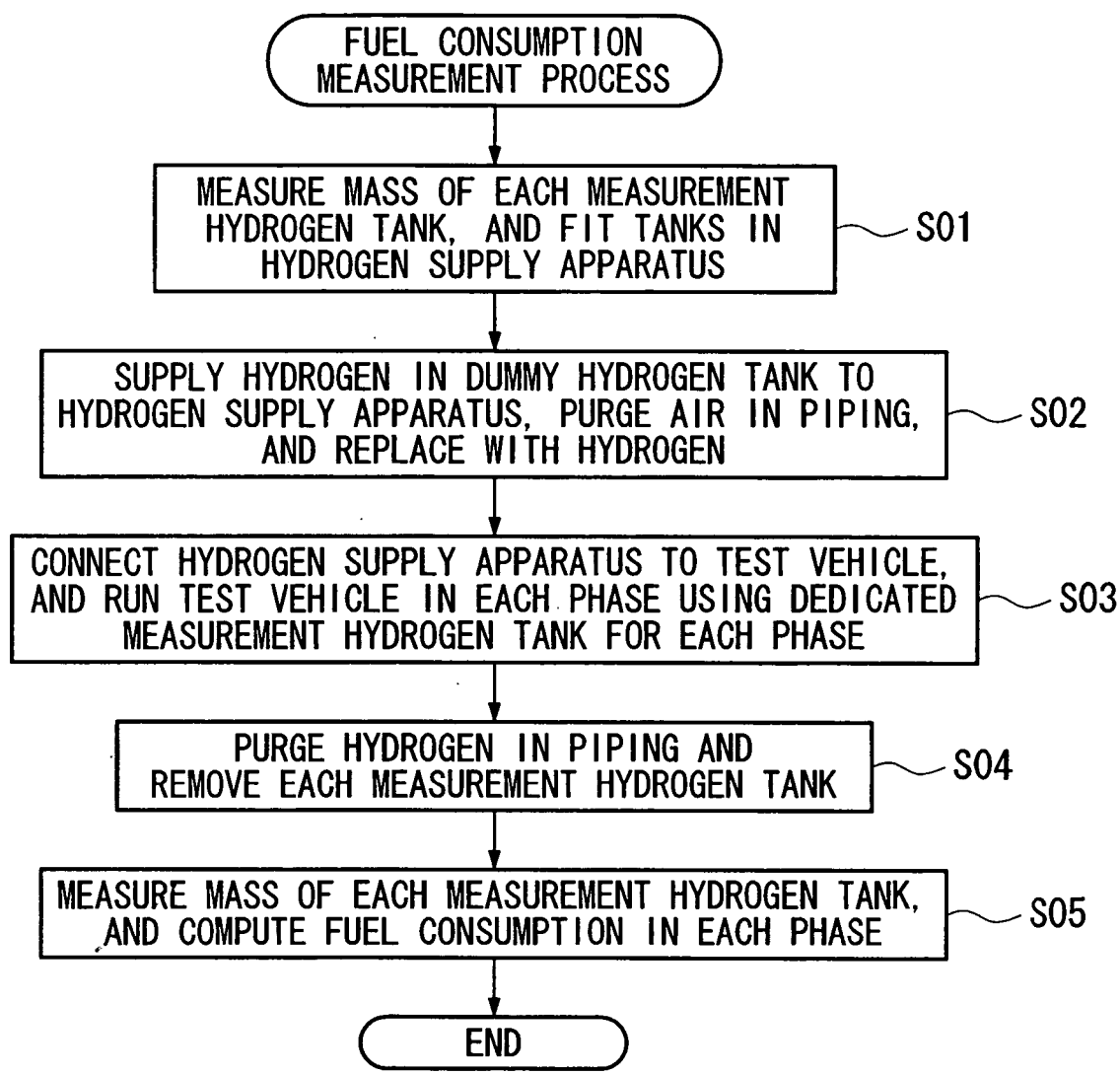
FIG. 1 is a flow chart showing an outline of a hydrogen supply method for measuring fuel consumption according to the present invention.

An outline of the hydrogen supply method for measuring fuel consumption according to the present invention is explained according to the flow chart in FIG. 1.

The explanation hereunder assumes the continuous measurement of fuel consumption in each phase when a single test vehicle is run in a plurality of phases (or modes), and a dedicated measurement hydrogen tank is therefore provided for each phase. Furthermore, the configuration of the hydrogen supply apparatus for measuring fuel consumption is such that the plurality of measurement hydrogen tanks can be connected in parallel. Moreover, a dummy hydrogen tank is provided in order to purge air in the piping of the hydrogen supply apparatus without using hydrogen from the measurement hydrogen tanks.

In step S01, the mass of each measurement hydrogen tank is first measured, and each measurement hydrogen tank is fitted to the hydrogen supply apparatus.

In step S02, hydrogen from the dummy hydrogen tank is supplied to the hydrogen supply apparatus, air in the piping of the hydrogen supply apparatus is purged, and the piping is filled with hydrogen. In other words, air in the piping is replaced with hydrogen with the dummy hydrogen tank.

In step S03, the hydrogen supply apparatus is connected to the test vehicle to enable supply of hydrogen to the test vehicle, hydrogen from the dedicated aforementioned measurement hydrogen tanks is supplied for each phase, and the test vehicle is run in each phase.

In step S04, hydrogen in the piping of the hydrogen supply apparatus is purged to prevent leakage of hydrogen from the piping when the measurement hydrogen tanks are removed from the hydrogen supply apparatus, and each measurement hydrogen tank is removed.

In step S05, the mass of each measurement hydrogen tank is measured, and the fuel consumption in each phase is computed from the difference in mass before and after the test.

In this manner, prior to supplying hydrogen from the measurement hydrogen tanks to the test vehicle, hydrogen is supplied from the dummy hydrogen tank to the piping in the hydrogen supply apparatus to purge air from the piping, and after filling the piping with hydrogen from the dummy hydrogen tank, the hydrogen from the measurement hydrogen tanks can be supplied to the test vehicle via the piping. Therefore, errors in measurement resulting from air remaining in the piping can be eliminated. Moreover, the hydrogen from the measurement hydrogen tanks can be used solely for measurement of fuel consumption, and thus fuel consumption can be measured with extremely high accuracy.

The hydrogen supply method and supply apparatus for measuring fuel consumption are explained hereunder in detail.

[First Embodiment]

A first embodiment of the present invention is explained with reference to the drawings of FIG. 2 through FIG. 5.

In this embodiment, running of the hydrogen fuel vehicle being the test vehicle (hereafter referred to as the "test vehicle") V in four phases abbreviated as CT, CS, HT, and HS is reproduced on a chassis dynamometer 80, with hydrogen supplied from dedicated measurement hydrogen tanks T2, T3, T4 and T5 for each phase (CT, CS, HT, HS), and fuel consumption measured.

Figure 2:
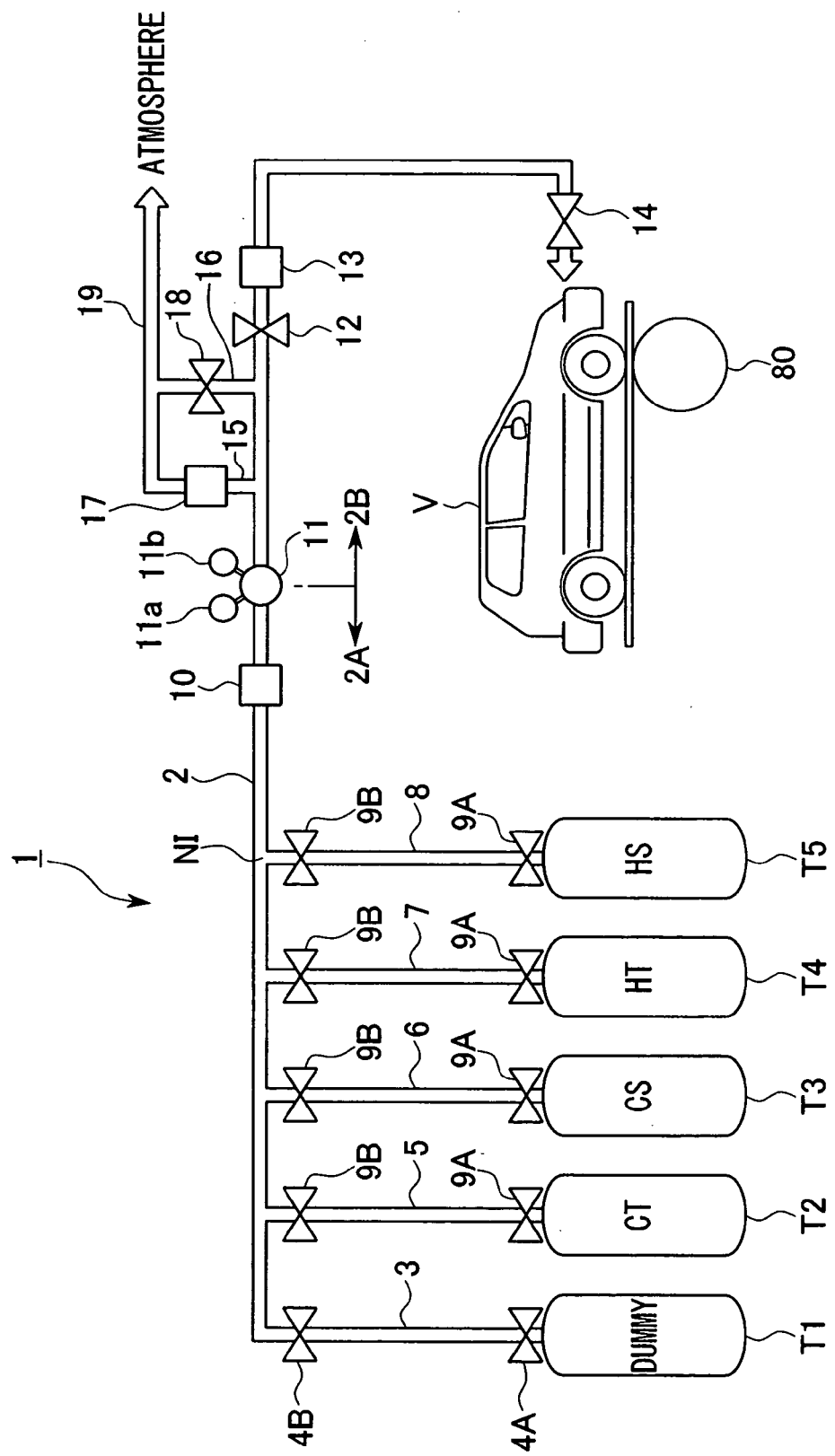
FIG. 2 is a diagram showing the first embodiment of a hydrogen supply apparatus for measuring fuel consumption according to the present invention.

As shown in FIG. 2, the hydrogen supply apparatus for measuring fuel consumption (hereafter referred to as the "hydrogen supply apparatus") 1 is provided with a main pipe 2, the end of which is extended to the vicinity of the chassis dynamometer 80. A dummy hydrogen tank T1 is connected to the end of the main pipe 2 via a dummy branch pipe 3. A first valve (open/close device) 4A and a second valve 4B are provided at both ends of the dummy branch pipe 3.

In practice, the first valve 4A is realized with the main valve fitted to the dummy hydrogen tank T1. However with the dummy hydrogen tank T1 connected to the dummy branch pipe 3, the first valve 4A can be said to be provided at the end of the dummy branch pipe 3.

Moreover, the four measurement branch pipes 5, 6, 7 and 8 are connected in parallel to the main pipe 2 at predetermined intervals from its end, and the measurement hydrogen tanks T2, T3, T4 and T5 are connected to the respective measurement branch pipes 5, 6, 7 and 8. In this first embodiment, the hydrogen supply apparatus comprises the main pipe 2 and the measurement branch pipes 5, 6, 7 and 8.

The measurement hydrogen tanks T2, T3, T4 and T5 are used for measuring fuel consumption in the phases CT, CS, HT, and HS respectively while running, thus one tank is used for each phase. The first valves (open/close devices) 9A, and second valves 9B, are provided at the ends of the measurement branch pipes 5, 6, 7 and 8.

In practice, each first valve 9A is realized with the main valve fitted to the measurement hydrogen tanks T2, T3, T4 and T5, however with the measurement hydrogen tanks T2, T3, T4 and T5 connected to the measurement branch pipes 5, 6, 7 and 8, the first valves 9A can be said to be provided at the end of the measurement branch pipes 5, 6, 7 and 8.

The dummy branch pipe 3 and each measurement branch pipe 5, 6, 7 and 8 may, for example, be comprised of flexible hose to enable ready fitting and removal of the hydrogen tanks T1, T2, T3, T4 and T5.

The flow control valve 10, the pressure regulator 11, the third valve 12, the emergency shut-off valve 13, and the fourth valve 14 are provided in that order in the main pipe 2 downstream of the connection N1 with the measurement branch pipe 8 located furthest downstream. The flow control valve 10 and the pressure regulator 11 are located close to the connection N1, and the fourth valve 14 is located at the end of the main pipe 2.

The pressure regulator 11 reduces the pressure of the high-pressure hydrogen supplied to the main pipe 2 from the measurement hydrogen tanks T2, T3, T4 and T5 to a lower measurement pressure Pt (approximately 0.9 MPa in this embodiment), and is provided with a primary pressure gage 11a to display the primary pressure, a secondary pressure gage 11b to display the secondary pressure, and a secondary pressure adjustment wheel (not shown in drawing). The emergency shut-off valve 13 is an automatic shut-off valve to automatically shut off the hydrogen in an emergency.

If necessary in the explanation hereunder, the main pipe 2 positioned upstream of the pressure regulator 11 is distinguished as the primary main pipe 2A, and the main pipe 2 positioned downstream of the pressure regulator 11, is distinguished as the secondary main pipe 2B.

Furthermore, the purge pipes 15 and 16 branch from the main pipe 2 between the pressure regulator 11 and the third valve 12, a pressure relief valve 17 is provided in the purge pipe 15, and a purge valve 18 is provided in the purge pipe 16. The pressure relief valve 17 and the purge valve 18 are connected to the purge pipe 19, and the end of the purge pipe 19 is open to atmosphere.

In this embodiment, in the initial condition prior to measurement of fuel consumption, the dummy hydrogen tank T1 and the measurement hydrogen tanks T2, T3, T4 and T5 are filled with high-purity hydrogen (for example, 99.99%) at the same initial pressure Ps (slightly higher than 14 MPa in this embodiment).

Furthermore, in this embodiment, fuel consumption is first measured in the CT phase and CS phases consecutively, followed by measurement in the HT and HS phases consecutively, measurement in the CS and HT phases being separated by a predetermined interval of time.

Moreover, first valves 4A and 9A attached to the hydrogen tanks T2, T3, T4 and T5 are fully opened prior to connecting the hydrogen tanks T2, T3, T4 and T5 to the branch pipes 3, 5, 6, 7 and 8.

Figure 3:
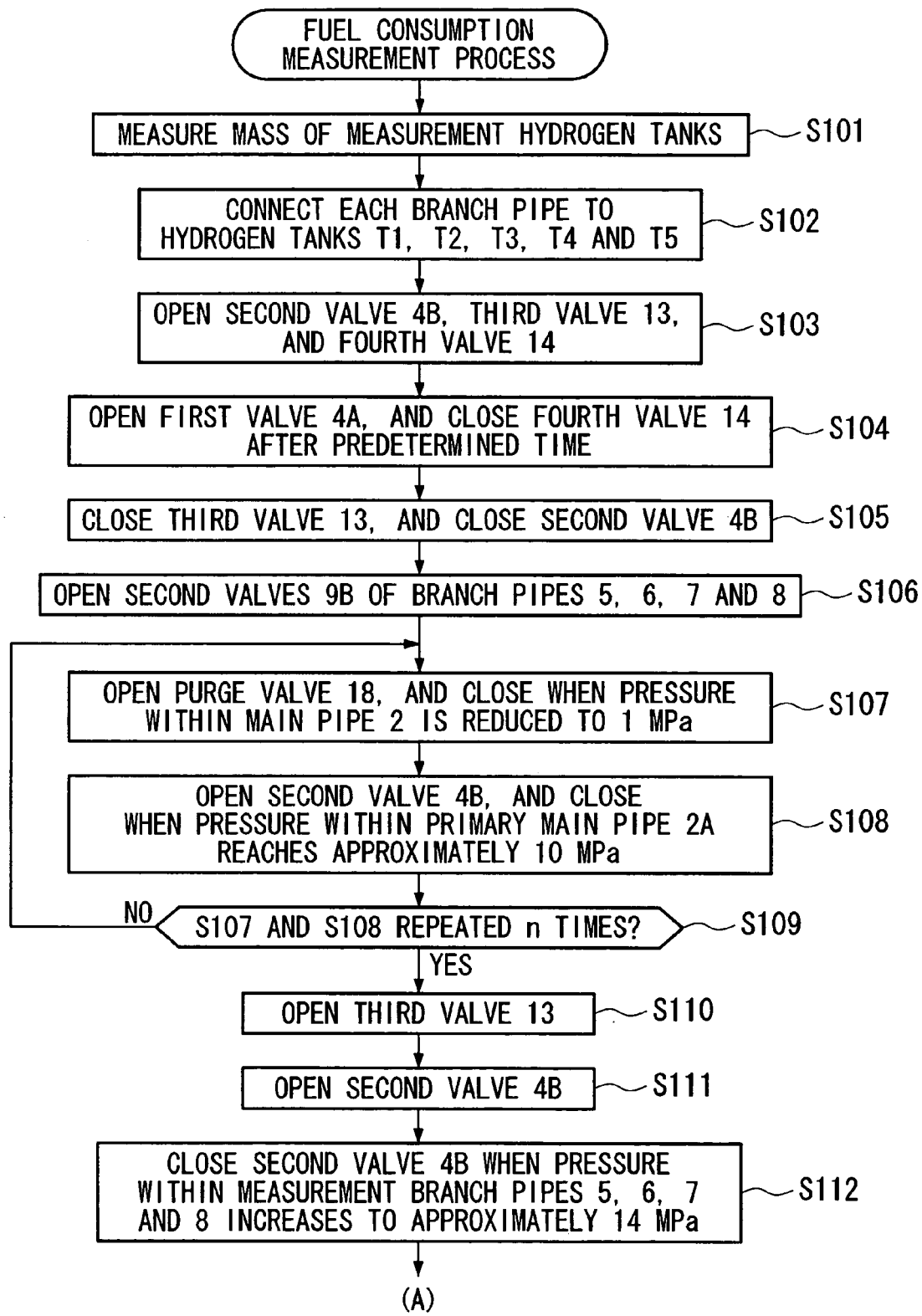
FIG. 3 is a flow chart showing a hydrogen supply method for measuring fuel consumption according to the first embodiment of the present invention (1 of 3).
Figure 4:
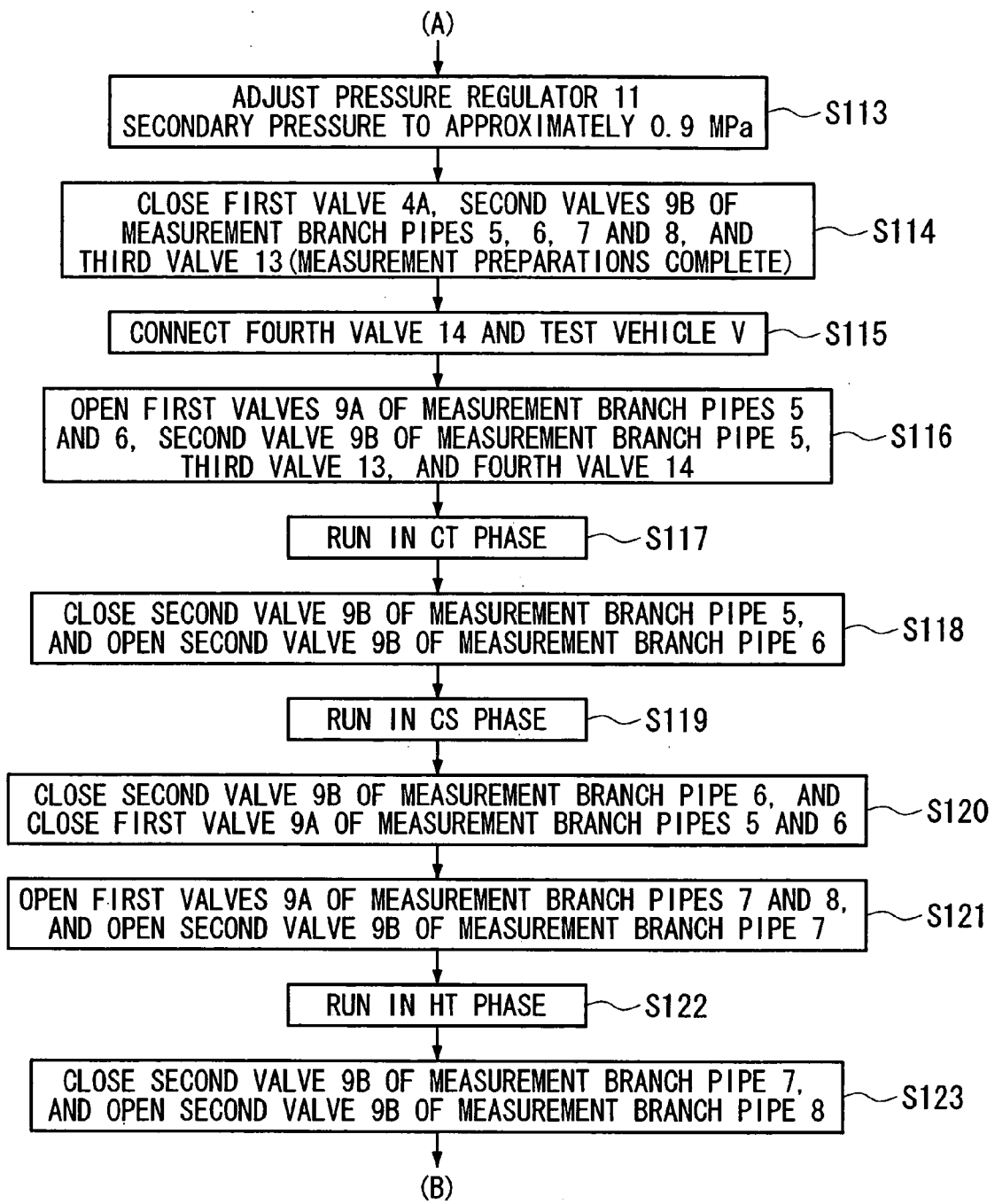
FIG. 4 is a flow chart showing the first embodiment of the hydrogen supply method for measuring fuel consumption of the present invention (2 of 3).
Figure 5:
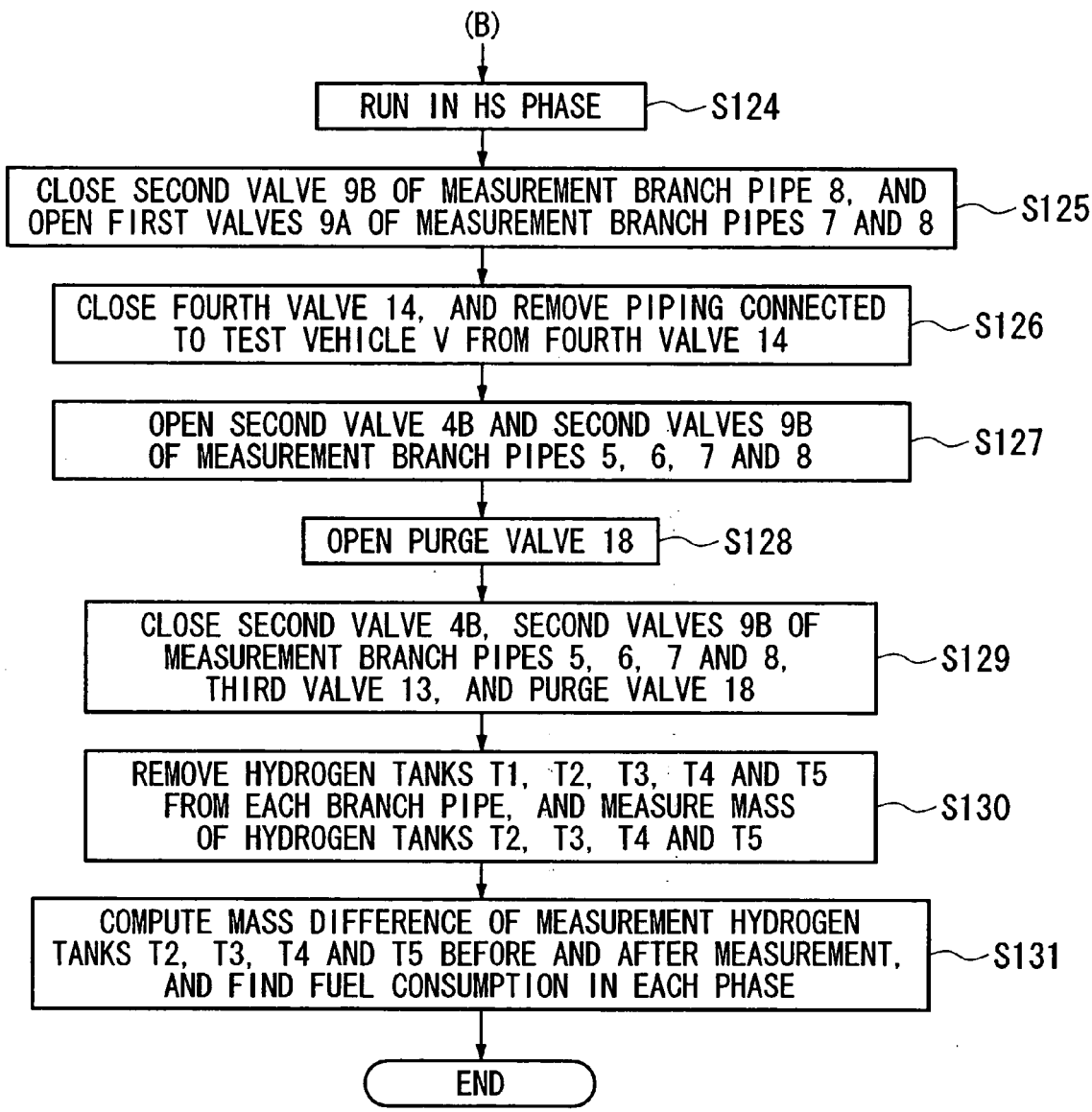
FIG. 5 is a flow chart showing the first embodiment of the hydrogen supply method for measuring fuel consumption of the present invention (3 of 3).

The use of this hydrogen supply apparatus 1 for measuring fuel consumption, and the method of supplying hydrogen to the test vehicle V, are explained with reference to the flow charts shown in FIG. 3 through FIG. 5. The test vehicle V is provided with an external supply port (not shown in the drawing) to enable the supply of hydrogen to the fuel cell mounted in the vehicle from an external source. However the fourth valve 14 is not connected to the external supply port prior to the operation explained hereunder.

At first the mass of the measurement hydrogen tanks T2, T3, T4 and T5 is measured accurately with a scale of high accuracy (step S101) prior to connecting the dummy hydrogen tank T1 and the measurement hydrogen tanks T2, T3, T4 and T5 to the dummy branch pipe 3 and the measurement branch pipes 5, 6, 7 and 8. Measurement of the mass of the dummy hydrogen tank T1 is unnecessary.

The second valve 4B of the dummy branch pipe 3, all second valves 9B of the measurement branch pipes 5, 6, 7 and 8, the purge valve 18, and the third valve 13 are then verified as being fully closed, and the dummy hydrogen tank T1 and all measurement hydrogen tanks T2, T3, T4 and T5 are connected to the respective branch pipes 3, 5, 6, 7 and 8 (step S102). In practice, the end of the dummy branch pipe 3 is connected to the first valve 4A of the dummy hydrogen tank T1, and each first valve 9A of the measurement hydrogen tanks T2, T3, T4 and T5 is connected to the end of the respective measurement branch pipes 5, 6, 7 and 8.

Next the second valve 4B of the dummy branch pipe 3, the third valve 13, and the fourth valve 14 are opened, and the main pipe 2 and the dummy branch pipe 3 are opened to atmosphere (step S103). At this point, all the second valves 9B of the measurement branch pipes 5, 6, 7 and 8 are closed.

Then the first valve 4A of the dummy branch pipe 3 is opened, hydrogen from the dummy hydrogen tank T1 is supplied to the main pipe 2 via the dummy branch pipe 3, the air in the main pipe 2 is forced out and purged from the fourth valve 14, and the fourth valve 14 is closed after a time sufficient for the air to be completely replaced with hydrogen (for example, approximately five seconds) (step S104). As a result the hydrogen of the dummy hydrogen tank T1 is filled into the main piping 2 under pressure. After this the third valve 13 is closed, and the second valve 4B of the dummy branch pipe 3 is closed (step S105).

As a result, the primary main pipe 2A is filled with high-purity hydrogen at high-pressure, and the secondary main pipe 2B is filled with high-purity hydrogen at low-pressure.

Next, all the second valves 9B of the measurement branch pipes 5, 6, 7 and 8 are opened, connecting the measurement branch pipes 5, 6, 7 and 8 to the primary main pipe 2A (step S106). As a result the pressure between the primary main pipe 2A and the measurement branch pipes 5, 6, 7 and 8 is equalized, and the pressure of the hydrogen within the primary main pipe 2A is dispersed to the measurement branch pipes 5, 6, 7 and 8. Conversely, the air in the measurement branch pipes 5, 6, 7 and 8 is dispersed within the main pipe 2A, and the gases are mixed. As a result the air in the measurement branch pipes 5, 6, 7 and 8 is diluted with hydrogen. Here, since the second valve 4B of the dummy branch pipe 3 is closed, air is not dispersed to inside the dummy branch pipe 3.

Next the purge valve 18 is opened to purge the gas within the main pipe 2 upstream of the third valve 13 to atmosphere, and when the pressure within the main pipe 2 upstream of the third valve 13 drops to a pressure slightly higher than the pressure Pe following completion of purging (approximately 1 MPa in this embodiment) the purge valve 18 is closed (step S107).

Then the second valve 4B of the dummy branch pipe 3 is opened and hydrogen from the dummy hydrogen tank T1 is again supplied to the primary main pipe 2A via the dummy branch pipe 3, and when the pressure within the primary main pipe 2A reaches a dilution pressure Pk (approximately 10 MPa in this embodiment) at a predetermined amount lower than the initial pressure Ps, the second valve 4B is closed (step S108). At this time, since the second valves 9B of the measurement branch pipes 5, 6, 7 and 8 are open, pressure is equalized between the primary main pipe 2A and the measurement branch pipes 5, 6, 7 and 8, and the high-purity hydrogen within the primary main pipe 2A is dispersed within the measurement branch pipes 5, 6, 7 and 8. Conversely, the mixture of air and hydrogen remaining in the measurement branch pipes 5, 6, 7 and 8 is dispersed within the primary main pipe 2A. As a result, the concentration of the hydrogen in the measurement branch pipes 5, 6, 7 and 8 is increased, in other words, the concentration of the air in the measurement branch pipes 5, 6, 7 and 8 is reduced.

In this first embodiment, the first step of air purge processing is realized with the processing in step S104 or step S108, the second step of air purge processing is realized with the processing in step S105 and step S106, and the third step of air purge processing is realized with the processing in step S107. Thus the air purge processing comprises these first, second, and third steps.

Repetition of the processing in steps S107 and S108 further reduces the concentration of air remaining in the measurement branch pipes 5, 6, 7 and 8, and the more the steps S107 and S108 are repeated the closer the concentration of hydrogen in the measurement branch pipes 5, 6, 7 and 8 can be made to approach the concentration of the hydrogen in the measurement hydrogen tanks T2, T3, T4 and T5 without limit. In this embodiment, the number of the cycles n required to reach the predetermined tolerance in concentration of the hydrogen in the measurement branch pipes 5, 6, 7 and 8 was determined experimentally. The required number of cycles n varies according to the diameter and length of the primary main pipe 2A, the diameter and length of the measurement branch pipes, and the number of measurement branch pipes.

Next it is determined whether or not the number of repetitions N of the processing in steps S107 and S108 has reached n cycles (for example, five cycles) (step S109). If n is not reached, the flow returns to step S107, and if n is reached the third valve 13 is opened (step S110).

Then the second valve 4B of the dummy branch pipe 2A is opened and hydrogen from the dummy hydrogen tank T1 is supplied to the primary main pipe 2A and the pressure within the primary main pipe 2A increased (step S111).

Then when the pressure in the primary main pipe 2A and each of the measurement branch pipes 5, 6, 7 and 8 increases to a pressure near the initial pressure of approximately 14 MPa of the measurement hydrogen tanks T2, T3, T4 and T5, the second valve 4B is closed (step S112).

Next the pressure on the secondary side of the pressure regulator is adjusted to the measurement pressure Pt (approximately 0.9 MPa) (step S113)

Then the first valve 4A of the dummy branch pipe 3, all second valves 9B of the measurement branch pipes 5, 6, 7 and 8, and the third valve 13, are closed (step S114).

Hydrogen in the dummy hydrogen tank T1 is used in this manner to adjust the hydrogen concentration within the main pipe 2 and the measurement branch pipes 5, 6, 7 and 8 following fitting of the measurement hydrogen tanks T2, T3, T4 and T5 in the hydrogen supply apparatus 1, to a concentration that does not affect errors in measurement (in other words, the tolerance for hydrogen concentration when measuring fuel consumption), thus completing preparations for measuring fuel consumption.

Next, the fourth valve 14 and the external supply port of the test vehicle V are connected with a flexible tube or the like (step S115), and fuel consumption is measured in the CT phase and CS phase.

At first the first valves 9A of the measurement branch pipes 5 and 6, the second valve 9B of the measurement branch pipe 5, the third valve 13, and the fourth valve 14 are opened (step S116), to enable the supply of hydrogen from the measurement hydrogen tank T2 to the test vehicle V, and then the dynamometer 80 is run according to a preset program to reproduce running in the CT phase (step S117). Only hydrogen from the measurement hydrogen tank T2 in the test vehicle V is consumed while running in the CT phase.

When running in the CT phase is complete the second valve 9B of the measurement branch pipe 5 is closed, and the second valve 9B in the measurement branch pipe 6 is opened (step S118), to enable supply of hydrogen from the measurement hydrogen tank T3 to the test vehicle V, and then the dynamometer 80 is run according to a preset program to reproduce running in the CS phase (step S119). Only hydrogen from the measurement hydrogen tank T6 in the test vehicle V is consumed while running in the CS phase.

When running in the CS phase is complete, the second valve 9B of the measurement branch pipe 6 is closed, and the first valves 9A of the measurement branch pipes 5 and 6 are closed (step S120).

Fuel consumption is then measured in the HT phase and HS phase.

At first the first valves 9A of the measurement branch pipes 7 and 8 are opened, and the second valve 9B of the measurement branch pipe 7 is opened (step S121), to enable the supply of hydrogen from the measurement hydrogen tank T4 to the test vehicle V, and then the dynamometer 80 is run according to a preset program to reproduce running in the HT phase (step S122). Only hydrogen from the measurement hydrogen tank T4 in the test vehicle V is consumed while running in the HT phase.

When running in the HT phase is complete the second valve 9B of the measurement branch pipe 7 is closed, and the second valve 9B of the measurement branch pipe 8 is opened (step S123), to enable supply of hydrogen from the measurement hydrogen tank T5 to the test vehicle V, and then the dynamometer 80 is run according to a preset program to reproduce running in the HS phase (step S124). Only hydrogen from the measurement hydrogen tank T5 in the test vehicle V is consumed while running in the HS phase.

When running in the HS phase is complete, the second valve 9B of the measurement branch pipe 8 is closed, and each valve 9A of the measurement branch pipes 7 and 8 are closed (step S125).

Next, the fourth valve 14 is closed and the pipe connected to the test vehicle V is then removed from the fourth valve 14 (step S126).

Then to prevent leakage of hydrogen to atmosphere from the piping when the hydrogen tanks T1, T2, T3, T4 and T5 are removed from the hydrogen supply apparatus 1, the second valve 4B in the dummy branch pipe 3 and all second valves 9B of the measurement branch pipes 5, 6, 7 and 8 are opened (step S127), the purge valve 18 is opened (step S128), and the hydrogen remaining in the main pipe 2, the dummy branch pipe 3, and the measurement branch pipes 5, 6, 7 and 8 is purged from the purge valve 18.

Next, the second valve 4B in the dummy branch pipe 3, all second valves 9B of the measurement branch pipes 5, 6, 7 and 8, the third valve 13, and the purge valve 18 are closed (step S129).

Then the dummy hydrogen tank T1 is removed from the dummy branch pipe 3, the measurement hydrogen tanks T2, T3, T4 and T5 are removed from the measurement branch pipes 5, 6, 7 and 8, and the mass of the measurement hydrogen tanks T2, T3, T4 and T5 is measured with the scale used in the processing in step S101 (step S130). Measurement of the mass of the dummy hydrogen tank T1 is unnecessary.

Next the difference in the mass of each of the measurement hydrogen tanks T2, T3, T4 and T5 before and after measurement of fuel consumption is computed to find the fuel consumption in each phase (step S131). This completes measurement of fuel consumption.

After this the fuel consumption in each phase can be computed based on the distance run in each phase as computed from the cumulative number of revolutions of the chassis dynamometer 80 in each phase, and the fuel consumption in each phase found in step S131.

Since the hydrogen in each measurement hydrogen tank is consumed during the measurement of fuel consumption in the respective phases, the pressure within the measurement hydrogen tanks is reduced, thus inviting a reduction in the pressure in the main pipe 2. However in the hydrogen supply apparatus 1 of this embodiment, since the pressure regulator 11 is provided in the main pipe 2, the effect of the reduction in pressure in the main pipe 2 associated with the reduction in pressure in the measurement hydrogen tanks is held in the primary main pipe 2A upstream of the pressure regulator 11, and the pressure within the secondary main pipe 2B can always be maintained at the measurement pressure Pt from start to completion of measurement of fuel consumption.

Therefore errors in measurement of fuel consumption resulting from changes in hydrogen pressure before and after measurement of fuel consumption are limited to errors in measurement due to the change in pressure in the primary main pipe 2A, and errors in measurement of fuel consumption can be greatly reduced in comparison with the case wherein the pressure regulator 11 is not provided. In order to maximize this effect, in this embodiment the pressure regulator 11 is provided close to the connection N1 of the furthest downstream measurement branch pipe 8 and the main pipe 2.

According to the hydrogen supply apparatus 1 and the hydrogen supply method of the first embodiment, execution of the processing in steps S101 through S114 enables almost complete replacement of air in the piping, since hydrogen from the dummy hydrogen tank T1 is supplied to the main pipe 2 and the measurement branch pipes 5, 6, 7 and 8 to purge air from the piping and replace it with hydrogen supplied from the dummy hydrogen tank T1 prior to the supply of hydrogen from the measurement hydrogen tanks T2, T3, T4 and T5 to the test vehicle V. Therefore when subsequently using the hydrogen from the measurement hydrogen tanks T2, T3, T4 and T5 in measurement of fuel consumption in each phase in steps S115 through S131, errors in measurement resulting from air remaining in the piping can be extremely small, and thus the accuracy of measurement of fuel consumption can be extremely high.

Moreover, when executing the processing in steps S101 through S114, none of the hydrogen from the measurement hydrogen tanks T2, T3, T4 and T5 is used. Therefore, fuel consumption in each phase obtained by executing the processing in step S131 precisely reflects the fuel consumed by the test vehicle V, and accuracy of measurement of fuel consumption is therefore extremely high.

Furthermore, fuel consumption can be measured successively in the four phases CT, CS, HT, and HS continuously.

In the first embodiment, when the measurement branch pipes 5, 6, 7 and 8 are extremely short so that the effects of the air in the piping on errors in measurement of fuel consumption can be ignored, the second valves 9B may be omitted so that the measurement branch pipes 5, 6, 7 and 8 are connected directly to the upstream main pipe 2A. In the extreme case, the second valves 9B and the measurement branch pipes 5, 6, 7 and 8 may be omitted and the first valves 9A associated with the measurement hydrogen tanks T2, T3, T4 and T5 connected directly to the upstream main pipe 2A. When the hydrogen supply apparatus 1 is configured in this manner, the processing in steps S105 through S110 executed to dilute the air in the measurement branch pipes 5, 6, 7 and 8 with hydrogen from the dummy hydrogen tank T1 may be omitted.

[Second Embodiment]

Figure 6:
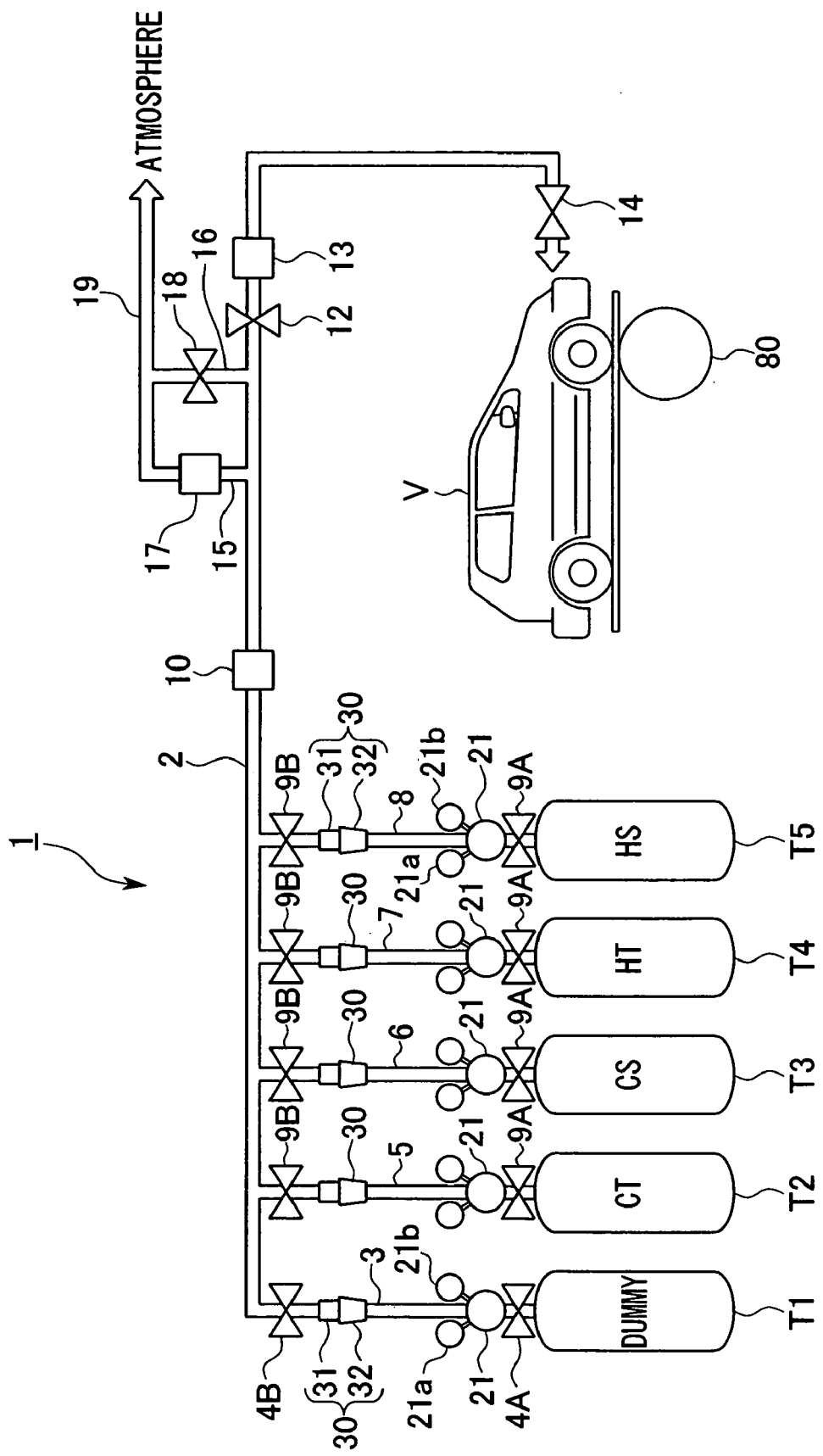
FIG. 6 is a diagram showing a second embodiment of a hydrogen supply apparatus for measuring fuel consumption of the present invention.
Figure 7:
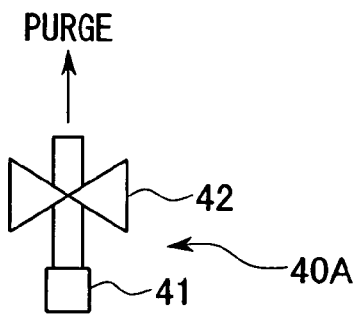
FIG. 7 is a diagram showing an air bleed adaptor used in implementing the hydrogen supply method for measuring fuel consumption according to the second embodiment of the present invention.

A second embodiment of the present invention is explained with reference to the drawings of FIG. 6 through FIG. 8.

The configuration of the hydrogen supply apparatus 1 of the second embodiment is explained with reference to FIG. 6. The differences of the hydrogen supply apparatus 1 of the second embodiment to that of the first embodiment is as follows.

The hydrogen supply apparatus 1 of the second embodiment is not provided with a pressure regulator 11 in the main pipe 2. Instead, a pressure regulator 21 is provided for each dummy branch pipe 3 and measurement branch pipes 5, 6, 7 and 8. The pressure regulators 21 are provided immediately downstream of the first valve 4A and the first valves 9A. As with the pressure regulator 11, the pressure regulator 21 comprises a primary pressure gage 21a and a secondary pressure gage 21b, and a secondary pressure adjustment wheel (not shown in drawing).

Furthermore, a connector 30 is provided in the dummy branch pipe 3 and the measurement branch pipes 5, 6, 7 and 8 in the hydrogen supply apparatus 1 of this second embodiment to enable the branch pipes 3, 5, 6, 7 and 8 to be separated on the upstream and downstream side of the connector 30.

The connector 30 comprises male and female connectors 31 and 32 respectively that may be mutually connected and disconnected, the male connector 31 and the female connector 32 each incorporating a non-return valve. The non-return valve is closed when the male connector 31 and female connector 32 are disconnected to prevent outflow of gas from the male connector 31 and female connector 32, and is opened when the male connector 31 and female connector 32 are connected to enable passage of gas between the male connector 31 and female connector 32. This connector 30 is readily connected and disconnected such that the male connector 31 and female connector 32 may be readily connected by pressure of the human hand, and are such that a gas seal is maintained when the male connector 31 and female connector 32 are connected. In this first embodiment, the connector 30 realizes "a connector fitted with an automatic open/close mechanism that automatically opens and closes when the connector is fitted or removed".

Moreover, the connector 30 provided in the dummy branch pipe 3 and the connector 30 provided in the measurement branch pipes 5, 6, 7 and 8 are of the same specification, and are interchangeable. For example, it is possible to connect the male connector 31 connected to the dummy branch pipe 3 to the female connector 32 connected to the measurement branch pipes 5, 6, 7 and 8, and to connect the male connector 31 connected to the measurement branch pipes 5, 6, 7 and 8 to the female connector 32 connected to the dummy branch pipe 3.

Since other configurations of the hydrogen supply apparatus 1 are the same as for the hydrogen supply apparatus 1 of the first embodiment, the same symbols are employed for the same sections, and explanations are omitted.

In the hydrogen supply apparatus 1 of the second embodiment configured in this manner, the male connector 31 and the female connector 32 of the measurement branch pipes 5, 6, 7 and 8 are disconnected, and the piping from each female connector 32 to each first valve 9A is in unitized form with the respective measurement hydrogen tanks T2, T3, T4 and T5 (unitized measurement hydrogen tanks up to the female connector 32 in this manner are hereafter referred to as "unitized measurement hydrogen tanks"). Air within each branch pipe 5, 6, 7 and 8 is then purged for each unitized measurement hydrogen tank T2, T3, T4 and T5 (this process is hereafter referred to as "purging air from tank branch piping"). In order to purge air from the tank branch piping, a separate air bleed adaptor 40A as shown in FIG. 7, comprising a valve 42 fitted to a male connector 41 with the same specification as the male connector 31 of the connector 30 is provided separately.

Figure 8:
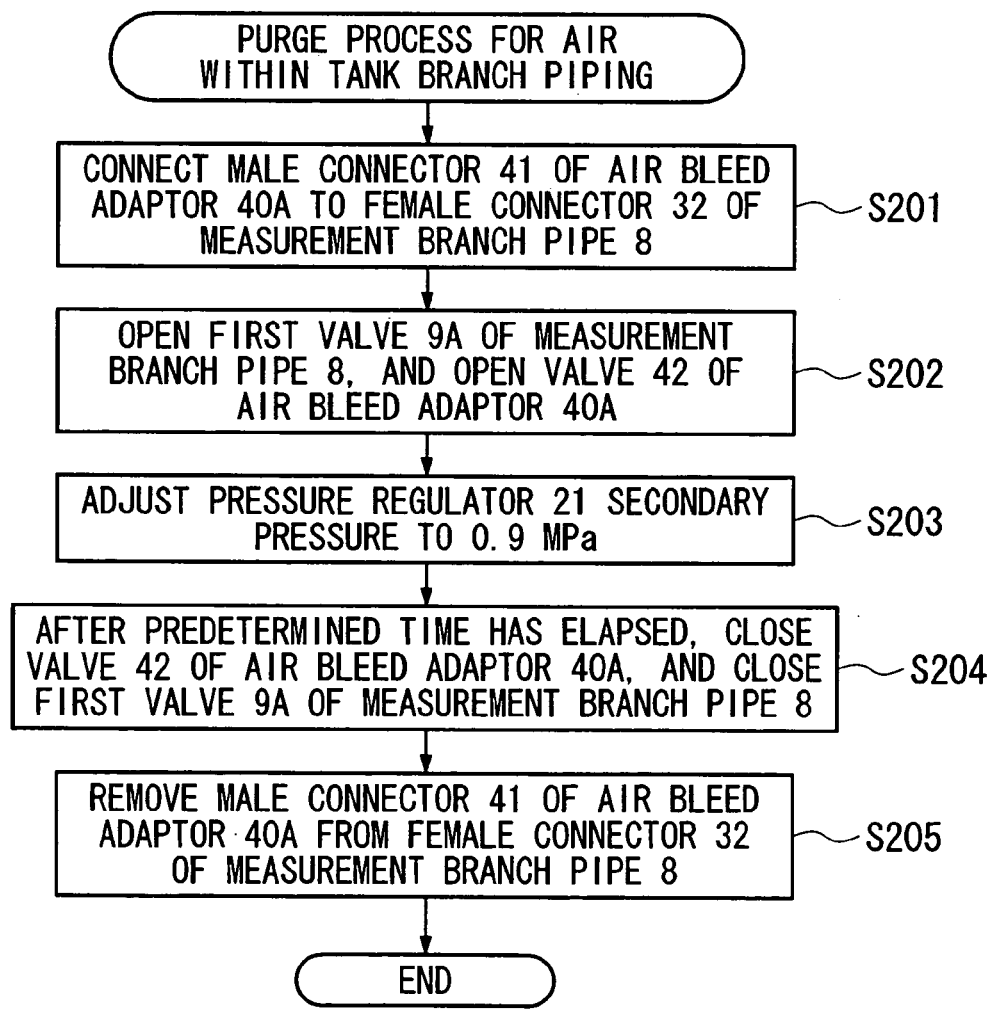
FIG. 8 is a flow chart showing processing for purging air from tank branch piping of the second embodiment of the present invention.

The procedure for purging air from the tank branch piping is explained with the flow chart in FIG. 8 using the measurement branch pipe 8 as an example.

At first, the valve 42 is closed and the male connector 41 of the air bleed adaptor 40A is connected to the female connector 32 of the measurement branch pipe 8 (step S201).

Then the first valve 9A of the measurement branch pipe 8 is opened, and the valve 42 in the air bleed adaptor 40A is opened to pass hydrogen from the measurement hydrogen tank T5 to the measurement branch pipe 8 (step S202). This forces out air within the measurement branch pipe 5, and air within the measurement branch pipe 5 can be replaced with hydrogen.

Then the secondary pressure in the pressure regulator 21 is adjusted to the measurement pressure Pt (approximately 0.9 MPa in this embodiment) (step S203).

Next, after elapse of a predetermined time required to completely force out air in the measurement branch pipe 8 (for example, approximately 3 seconds), the valve 42 of the air bleed adaptor 40A is closed, and the first valve 9A of the measurement branch pipe 8 is closed (step S204). The male connector 41 of the air bleed adaptor 40A is then removed from the female connector 32 of the measurement branch pipe 8 (step S205). When the male connector 41 of the air bleed adaptor 40A is disconnected from the female connector 32 of the measurement branch pipe 8, the non-return valve of the female connector 32 closes. Therefore the measurement branch pipe 8 is filled with hydrogen at the measurement pressure Pt and maintained in this condition.

In this manner, air is purged from the tank branch piping in the measurement branch pipes 5, 6, 7 and 8. Here purging of air from tank branch piping is unnecessary for the dummy branch pipe 3.

Next, in this second embodiment, following the air purge processing of the interior of the tank branch piping for the measurement branch pipes 5, 6, 7 and 8, the mass of each unitized measurement hydrogen tank T2, T3, T4 and T5 is measured. Measurement of the mass of the dummy hydrogen tank T1 is unnecessary.

Then, following completion of measurement of the mass of the unitized measurement hydrogen tanks T2, T3, T4 and T5, the female connectors 32 of the measurement branch pipes 5, 6, 7 and 8 are connected to the male connectors 31 of the respective measurement branch pipes 5, 6, 7 and 8 on the second valve 9B side.

This completes preparation for measuring fuel consumption.

With completion of these preparations, the air remaining in the piping between the female connectors 31 of the connectors 30 and the second valves 9B of the measurement branch pipes 5, 6, 7 and 8 is not yet purged. Consequently, in order to measure the fuel consumption in each phase with high accuracy, it is necessary to purge the air remaining in the piping.

Therefore in this second embodiment, following completion of the measurement of fuel consumption, the series of processing steps of the first embodiment beginning with step S103 is executed to thereby measure fuel consumption in each phase following purging of the air remaining in the piping.

In the second embodiment, however, a pressure regulator 21 is provided for each measurement hydrogen tank T2, T3, T4 and T5 in place of the pressure regulator 11 of the first embodiment. Since adjustment of the secondary pressure of each pressure regulator 21 is already completed during purging of the air from tank branch piping, step S113 is unnecessary, and the flow moves from step S112 to step S114.

Furthermore, in the second embodiment, following step S126, the second valve 4B is closed and then the female connectors 32 of each measurement branch pipe 5, 6, 7 and 8 are disconnected from the male connectors 31, the unitized measurement hydrogen tanks T2, T3, T4 and T5 are removed from the hydrogen supply apparatus 1, and the flow proceeds to step S127 and hydrogen is purged from the piping.

In the second embodiment, the mass of each unitized measurement hydrogen tank T2, T3, T4 and T5 removed from the hydrogen supply apparatus 1 is measured in the unitized condition, and the difference in mass of the measurement hydrogen tanks T2, T3, T4 and T5 before and after measurement of fuel consumption is computed to determine the fuel consumption in each phase.

Here, the male connector 31 and female connector 32 of the dummy branch pipe 3 may be connected at any time prior to the flow proceeding to step S103.

The hydrogen supply apparatus 1 and the hydrogen supply method of this second embodiment provides the following operations in addition to the operations of the first embodiment explained above.

According to the hydrogen supply apparatus 1 of the second embodiment, since the dummy branch pipe 3 and the measurement branch pipes 5, 6, 7 and 8 are provided with readily connected and disconnected connectors 30 between the pipes, the dummy hydrogen tank T1 and the measurement hydrogen tanks T2, T3, T4 and T5 may be readily fitted and removed, thus improving ease of use.

Furthermore, according to the hydrogen supply apparatus 1 and the hydrogen supply method of the second embodiment, as explained above, the measurement branch pipes 5, 6, 7 and 8 between the female connectors 32 and the measurement hydrogen tanks T2, T3, T4 and T5 are such that air can be purged completely prior to connecting to the male connectors 31 and replaced with hydrogen, thus further improving the accuracy of measurement of fuel consumption.

Moreover, since pressure regulators 21 are provided immediately downstream of the first valves 9A of the measurement branch pipes 5, 6, 7 and 8, the volume of the primary pressure piping wherein changes in pressure occur within the piping before and after measurement of fuel consumption can be reduced. In other words, since all pressure variation within the piping downstream of the pressure regulators 21 can be prevented, errors in measurement due to variations in pressure within the piping can be reduced even further than with the first embodiment.

[Third Embodiment]

A third embodiment of the present invention is explained with reference to the drawings of FIG. 9 through FIG. 14.

Figure 9:
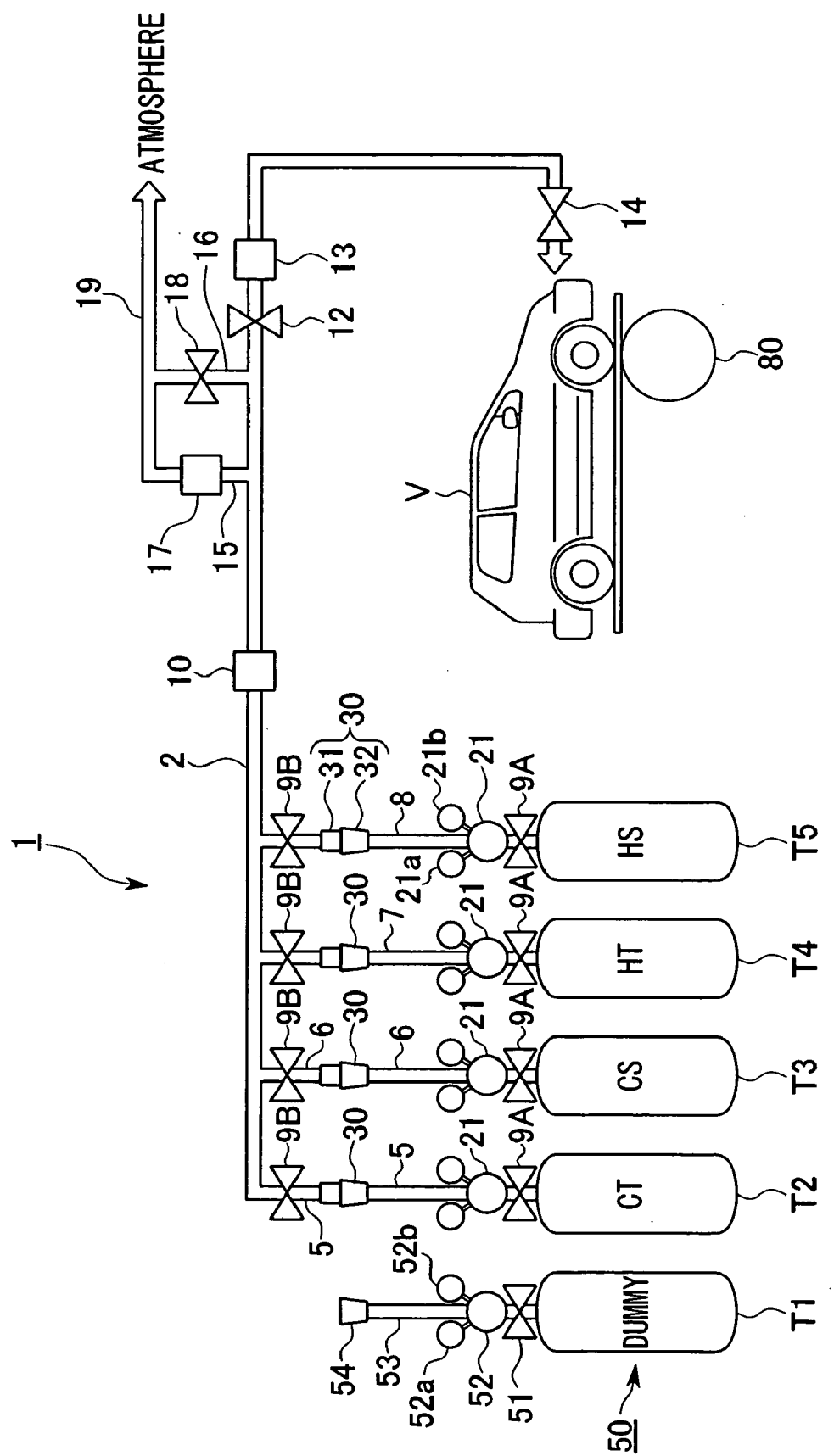
FIG. 9 is a diagram showing an arrangement after fitting of measurement hydrogen tanks of a third embodiment of a hydrogen supply apparatus for measuring fuel consumption of the present invention.

As shown in FIG. 9, the hydrogen supply apparatus 1 of the third embodiment comprises the hydrogen supply apparatus 1 of the second embodiment explained above with the dummy branch pipe 3 deleted. However, in the hydrogen supply apparatus 1 of the third embodiment, a dummy unit 50 incorporating a dummy hydrogen tank T1 is provided separately to the measurement hydrogen tanks T2, T3, T4 and T5.

This dummy unit 50 is provided with a dummy hydrogen tank T1, a main valve 51, a pressure regulator 52, a flexible tube 53, and a female connector 54 fitted at the tip of the flexible tube 53. The female connector 54 is of the same specification as the female connectors 32 of the measurement branch pipes 5, 6, 7 and 8. The pressure regulator 52 is provided with a primary pressure gage 52a, a secondary pressure gage 52b, and a secondary pressure adjustment wheel (not shown in drawing).

Figure 10:
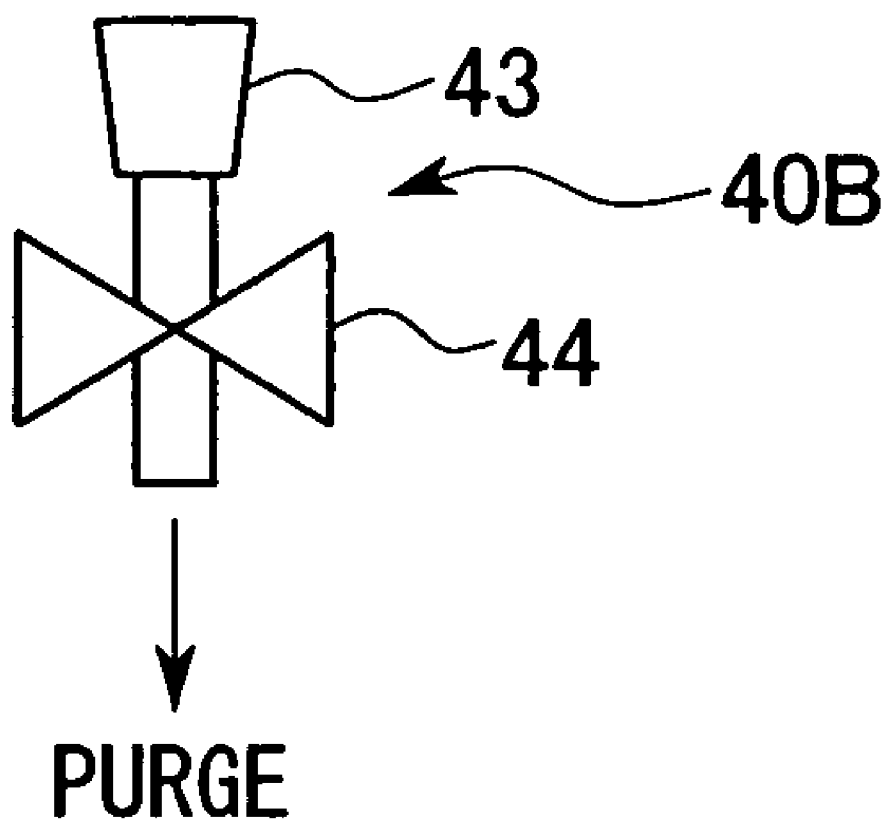
FIG. 10 is a drawing showing an air bleed adaptor used in implementing a hydrogen supply method for measuring fuel consumption according to the third embodiment of the present invention.

Furthermore, in this third embodiment, an air bleed adaptor 40B as shown in FIG. 10, comprising a valve 44 fitted to a female connector 43 with the same specification as the female connector 32 of the connector 30 is provided separately to the air bleed adaptor 40A.

Since other configurations of the hydrogen supply apparatus 1 are the same as for the hydrogen supply apparatus 1 of the first embodiment, the same symbols are employed for the same sections, and explanations omitted.

Figure 11:
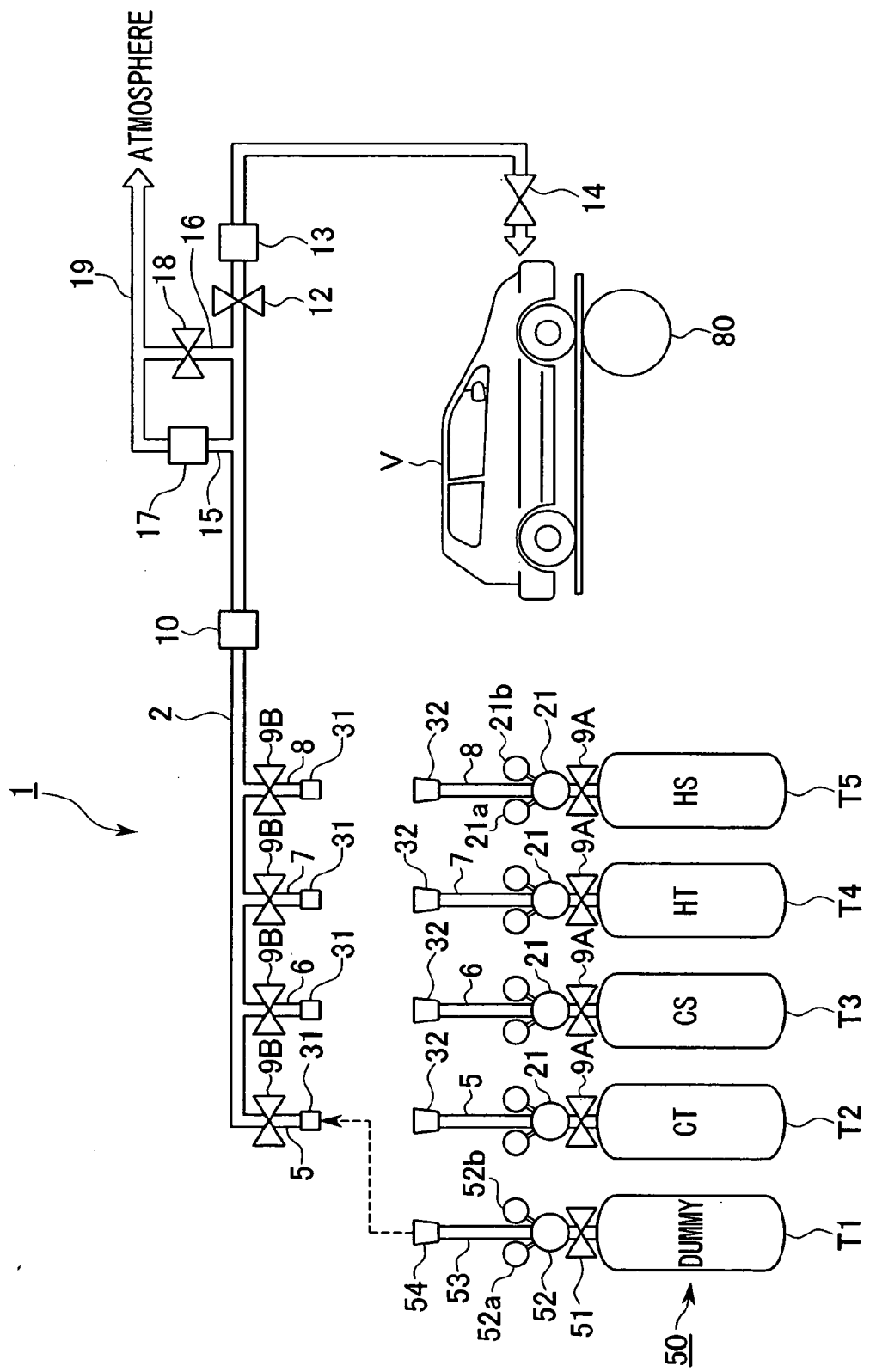
FIG. 11 is a block drawing showing an arrangement prior to fitting of measurement hydrogen tanks of the third embodiment of the hydrogen supply apparatus for measuring fuel consumption according to the present invention.

In this third embodiment also, as with the second embodiment, the male connector 31 and the female connector 32 of the measurement branch pipes 5, 6, 7 and 8 are disconnected, and as shown in FIG. 11, the piping from each female connector 32 to each first valve 9A is in unitized form with each respective measurement hydrogen tank T2, T3, T4 and T5. In other words, the unitized measurement hydrogen tanks T2, T3, T4 and T5 are provided.

Figure 12:
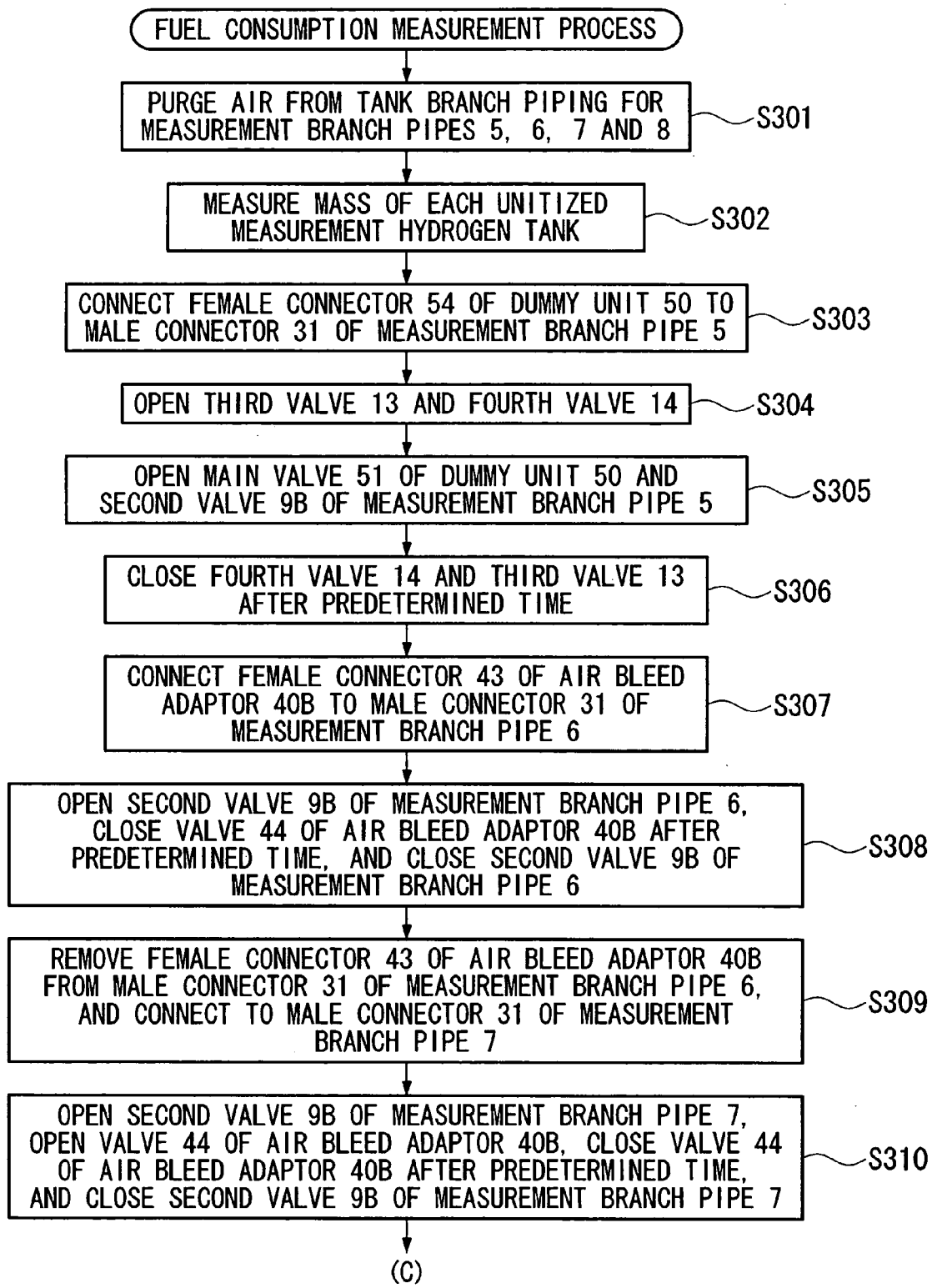
FIG. 12 is a flow chart showing a hydrogen supply method for measuring fuel consumption according to the third embodiment of the present invention (1 of 3).
Figure 13:
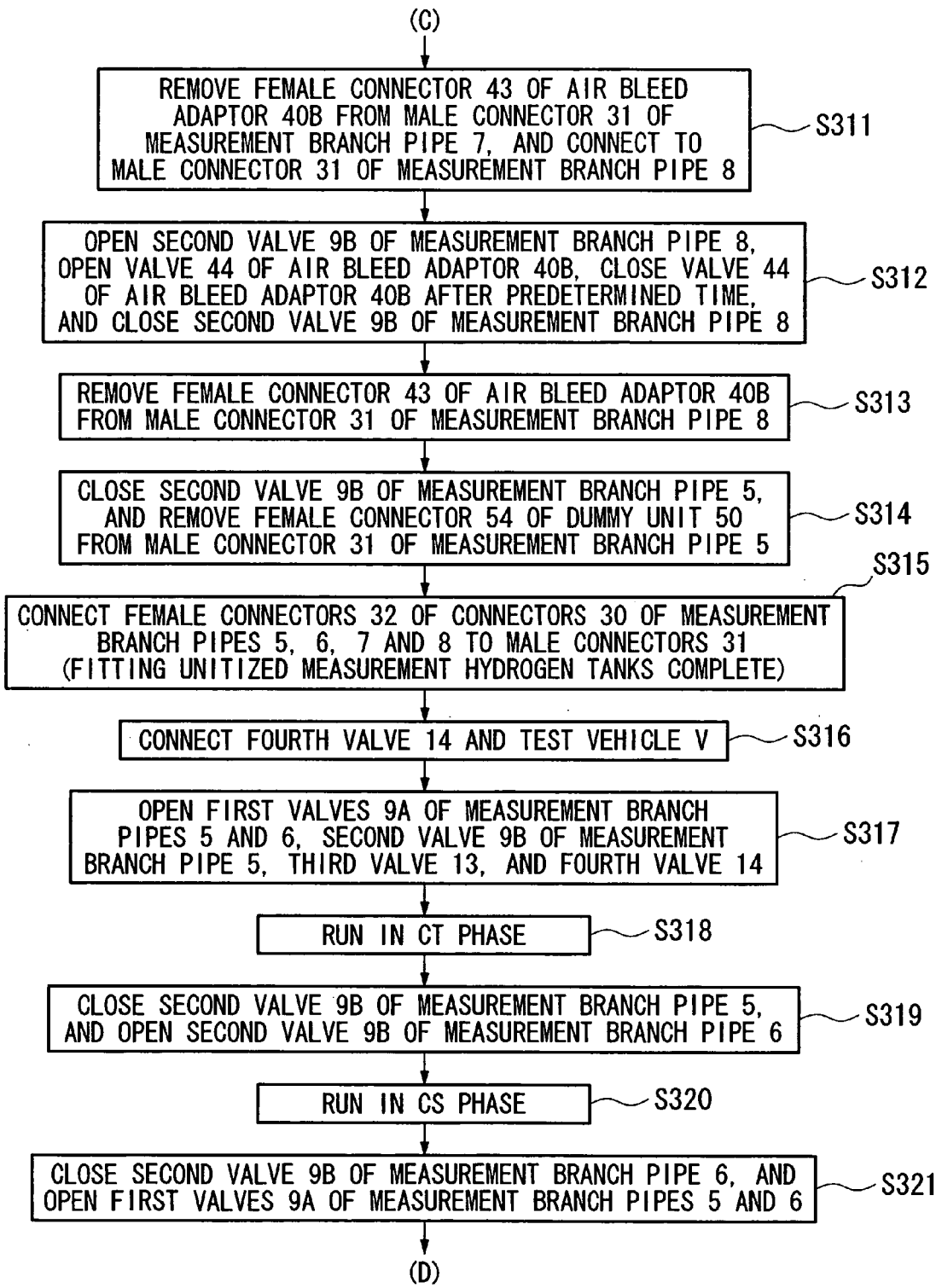
FIG. 13 is a flow chart showing the hydrogen supply method for measuring fuel consumption according to the third embodiment of the present invention (2 of 3).
Figure 14:
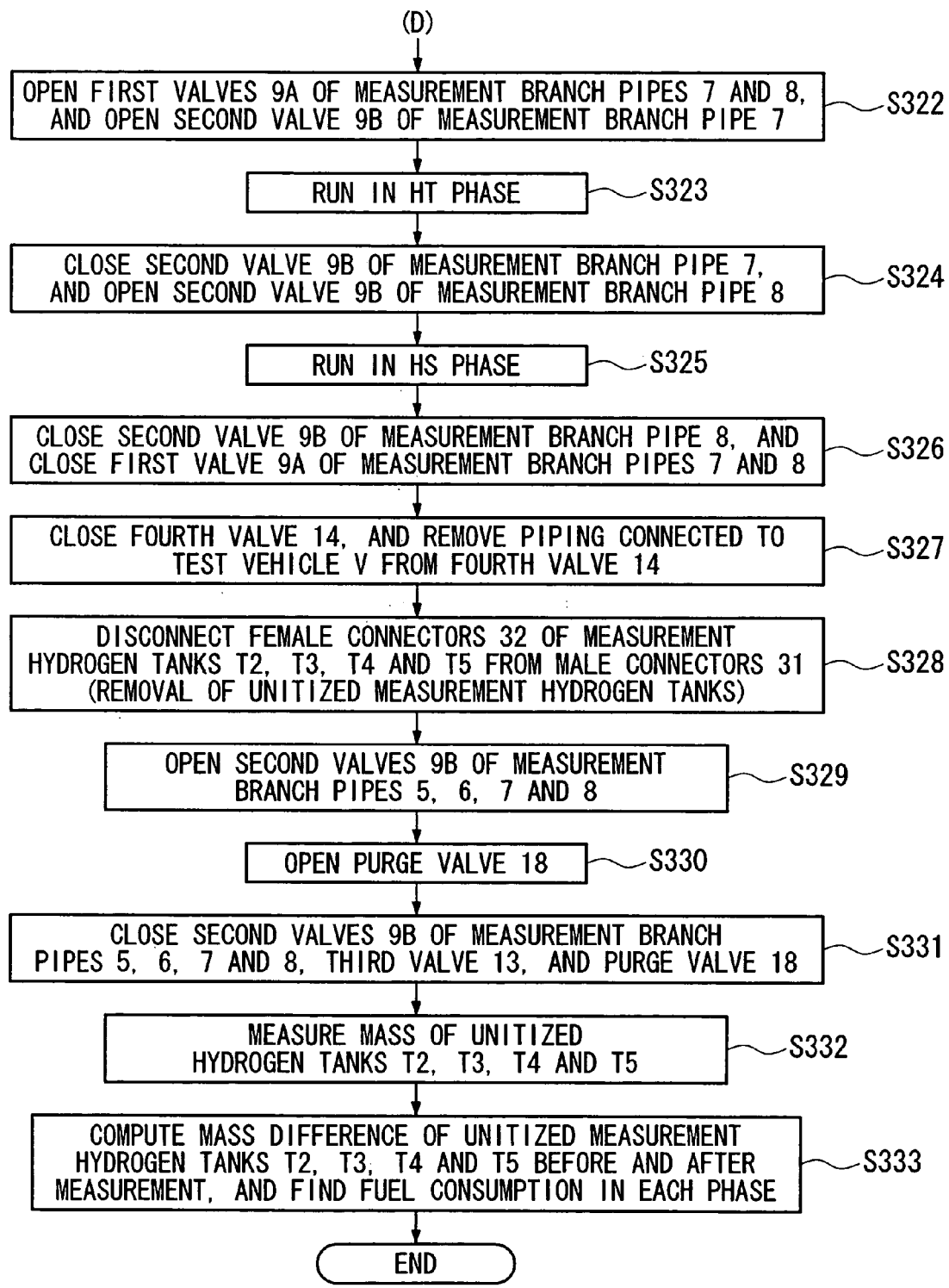
FIG. 14 is a flow chart showing the hydrogen supply method for measuring fuel consumption according to the third embodiment of the present invention (3 of 3).

Next the use of this hydrogen supply apparatus 1 for measuring fuel consumption, and the method of supplying hydrogen to the test vehicle V, are explained with reference to the flow charts shown in FIG. 12 through FIG. 14. As in the first embodiment, the test vehicle V is provided with an external supply port (not shown in the drawing) to enable the supply of hydrogen to the fuel cell mounted in the vehicle from an external source. However the fourth valve 14 is not connected to the external supply port prior to the processing hereunder.

At first, as with the second embodiment, the air bleed adaptor 40A is used to purge air from the tank branch piping for the measurement branch pipes 5, 6, 7 and 8 of the unitized measurement hydrogen tanks T2, T3, T4 and T5 (step S301). Since the method of purging air from the tank branch piping is exactly the same as for the second embodiment explanation is omitted (refer to steps S201 through S205 in FIG. 8).

This air purge processing of the interior of the tank branch piping purges air within the measurement branch pipes 5, 6, 7 and 8 of the unitized measurement hydrogen tanks T2, T3, T4 and T5, and fills the piping with hydrogen adjusted to the measurement pressure Pt (approximately 0.9 MPa in this embodiment).

Next the mass of the unitized measurement hydrogen tanks T2, T3, T4 and T5 is measured (step S302). Measurement of the mass of the dummy hydrogen tank T1 is unnecessary.

The female connector 54 of the dummy unit 50 wherein the main valve 51 has been closed is then connected to the male connector 31 of the measurement branch pipe 5 connected to the main pipe 2 (step S203).

Then, the third valve 13 and the fourth valve 14 are opened to open the main pipe 2 to atmosphere (step S304). At this time, all the second valves 9B of the measurement branch pipes 5, 6, 7 and 8 are closed.

Next, the main valve 51 of the dummy unit 50 and the second valve 9B of the measurement branch pipe 5 connected to the main pipe 2 are opened, and hydrogen from the dummy hydrogen tank T1 is supplied to the main pipe 2 via the flexible tube 53 of the dummy unit 50 and the measurement branch pipe 5, and air within the piping is forced out by hydrogen and purged from the fourth valve 14 (step S305). Then when a time sufficient for the air within the measurement branch pipe 5 and the main pipe 2 to be completely replaced with hydrogen (for example, approximately five seconds) has elapsed, the fourth valve 14 and the third valve 13 are closed (step S306). As a result, the main pipe 2 and the measurement branch pipe 5 connected to the main pipe 2 are filled with hydrogen at a measurement pressure Pt adjusted by the pressure regulator 52 of the dummy unit 50. Here, the main valve 51 of the dummy unit 50 and the second valve 9B of the measurement branch pipe 5 remain open.

Next, the female connector 43 of the air bleed adaptor 40B wherein the valve 44 is opened is connected to the male connector 31 of the measurement branch pipe 6 connected to the main pipe 2, and this measurement branch pipe 6 is opened to atmosphere (step S307).

After this, the second valve 9B of the measurement branch pipe 6 is opened, hydrogen from the dummy hydrogen tank T1 is supplied to the measurement branch pipe 6 via the main pipe 2, and air in the measurement branch pipe 6 is forced out by the hydrogen and purged from the valve 44 of the air bleed adaptor 40B. When a time sufficient for the air within the measurement branch pipe 6 to be completely replaced with hydrogen (for example, approximately five seconds) has elapsed, the valve 44 of the air bleed adaptor 40B is closed, and the second valve 9B of the measurement branch pipe 6 is closed (step S308).

Next, the female connector 43 of the air bleed adaptor 40B is removed from the male connector 31 of the measurement branch pipe 6 and connected to the female connector 31 of the measurement branch pipe 7 connected to the branch pipe 2 (step S309). When the female connector 43 of the air bleed adaptor 40B is disconnected from the male connector 31 of the measurement branch pipe 6, the non-return valve of the male connector 31 is closed. Therefore the measurement branch pipe 6 remains filled with hydrogen at the measurement pressure Pt without air entering the measurement branch pipe 6.

Next, the second valve 9B of the measurement branch pipe 7 is opened, the valve 44 of the air bleed adaptor 40B is opened, the hydrogen from the dummy hydrogen tank T1 is supplied to the measurement branch pipe 7 via the main pipe 2, and the air within the measurement branch pipe 7 is forced out by the hydrogen and purged from the valve 44 of the air bleed adaptor 40B. When a time sufficient for the air within the measurement branch pipe 7 to be completely replaced with hydrogen (for example, approximately five seconds) has elapsed, the valve 44 of the air bleed adaptor 40B is closed, and the second valve 9B of the measurement branch pipe 7 is closed (step S310).

Next, the female connector 43 of the air bleed adaptor 40B is removed from the male connector 31 of the measurement branch pipe 7 and connected to the female connector 31 of the measurement branch pipe 8 connected to the branch pipe 2 (step S311). When the female connector 43 of the air bleed adaptor 40B is disconnected from the male connector 31 of the measurement branch pipe 7 the non-return valve of the male connector 31 is closed. Therefore the measurement branch pipe 7 remains filled with hydrogen at the measurement pressure Pt without air entering the measurement branch pipe 7.

Next, the second valve 9B of the measurement branch pipe 8 is opened, the valve 44 of the air bleed adaptor 40B is opened, the hydrogen from the dummy hydrogen tank T1 is supplied to the measurement branch pipe 8 via the main pipe 2, and the air within the measurement branch pipe 8 is forced out by the hydrogen and purged from the valve 44 of the air bleed adaptor 40B. When a time sufficient for the air within the measurement branch pipe 8 to be completely replaced with hydrogen (for example, approximately five seconds) has elapsed, the valve 44 of the air bleed adaptor 40B is closed, and the second valve 9B of the measurement branch pipe 8 is closed (step S312).

Next, the female connector 43 of the air bleed adaptor 40B is removed from the male connector 31 of the measurement branch pipe 8 (step S313). Since the non-return valve of the male connector 31 is closed at this time, the measurement branch pipe 8 remains filled with hydrogen at the measurement pressure Pt without air entering the measurement branch pipe 8.

Next, the second valve 9B of the measurement branch pipe 5 is closed, and then the female connector 54 of the dummy unit 50 is removed from the male connector 31 of the measurement branch pipe 5 connected to the main pipe 2 (step S314). When the female connector 54 of the dummy unit 50 is disconnected from the male connector 31 of the measurement branch pipe 5 the non-return valve of the male connector 31 is closed. Therefore the measurement branch pipe 5 remains filled with hydrogen at the measurement pressure Pt without air entering the measurement branch pipe 5.

Execution of the processing in steps S301 through S314 in this manner enables almost complete replacement of the contents of the entire main pipe 2 and the measurement branch pipes 5, 6, 7 and 8 connected to the main pipe 2 up to the male connector 31, with hydrogen at the measurement pressure Pt. Moreover, since this air purge processing uses only hydrogen from the dummy hydrogen tank T1, without using any hydrogen from the measurement hydrogen tanks T2, T3, T4 and T5, no errors in measurement of fuel consumption arise with consumption of hydrogen for purging of air, as explained later.

Next, the female connectors 32 of the unitized measurement hydrogen tanks T2, T3, T4 and T5 are connected to each of the male connectors 31 of the respective measurement branch pipes 5, 6, 7 and 8 connected to the main pipe 2 to thereby complete fitting of the measurement hydrogen tanks T2, T3, T4 and T5 to the hydrogen supply apparatus 1 (step S315).

Here air purge processing of the interior of the tank branch piping for the measurement branch pipes 5, 6, 7 and 8 of the unitized measurement hydrogen tanks T2, T3, T4 and T5 is executed prior to connecting the male connectors 31 and the female connectors 32, and the interior is then filled with hydrogen at the measurement pressure Pt. Therefore, following connection of the connector 30, all piping of the hydrogen supply apparatus 1, except for the purge pipe 19, is filled with hydrogen at the measurement pressure Pt. This completes preparations for measuring fuel consumption.

The fourth valve 14 and the external supply port are then connected with a flexible tube or the like (step S316), and fuel consumption is measured successively in the CT, SC, HT and HS phases.

Hereunder since the processing from step S317 to step S327 corresponds to from step S116 to step S126 of the first embodiment, and processing contents for each step are exactly the same, explanation is omitted. Explanation of the processing continues from step S328.

In step S328, disconnection of the male connectors 31 from the female connectors 32 of each of the measurement branch pipes 5, 6, 7 and 8 removes the unitized measurement hydrogen tanks T2, T3, T4 and T5 from the hydrogen supply apparatus 1.

Next, for safety reasons, the second valves 9B of the measurement branch pipes 5, 6, 7 and 8 are opened (step S329), the purge valve 18 is opened (step S330), and the hydrogen remaining in all the measurement branch pipes 5, 6, 7 and 8 downstream of the main pipe 2 and the male connector 31 is purged from the purge valve 18.

Then, all the second valves 9B of the measurement branch pipes 5, 6, 7 and 8, the third valve 13, and the purge valve 18, are closed (step S331).

Next, the mass of the unitized measurement hydrogen tanks T2, T3, T4 and T5 removed from the measurement branch pipes 5, 6, 7 and 8 is measured (step S332).

The fuel consumption in each phase is then determined from the difference in mass of each unitized measurement hydrogen tank T2, T3, T4 and T5 computed before and after measurement of fuel consumption (step S333). This competes measurement of fuel consumption.

After this the fuel consumption in each phase is computed based on the distance run in each phase as computed from the cumulative number of revolutions of the chassis dynamometer 80 in each phase, and the fuel consumption in each phase found in step S333.

According to the hydrogen supply apparatus 1 and the hydrogen supply method of the third embodiment, execution of the processing in steps S301 through S315 enables almost complete replacement of air in the piping, since hydrogen from the dummy hydrogen tank T1 is supplied to the main pipe 2 and the measurement branch pipes 5, 6, 7 and 8 to purge air almost completely from the piping and replace it with hydrogen supplied from the dummy hydrogen tank T1 prior to the supply of hydrogen from the measurement hydrogen tanks T2, T3, T4 and T5 to the test vehicle V. Therefore when subsequently using the hydrogen from the measurement hydrogen tanks T2, T3, T4 and T5 in measurement of fuel consumption in each phase in steps S316 through S333, errors in measurement resulting from air remaining in the piping can be almost completely eliminated, and thus the accuracy of measurement of fuel consumption can be extremely high.

Moreover, since none of the hydrogen from the measurement hydrogen tanks T2, T3, T4 and T5 is used when the processing in steps S301 through S315 is executed, the fuel consumption in each phase as obtained from execution of the processing in step S333 is precisely the amount of fuel consumed by the test vehicle V, and thus the accuracy of measurement of fuel consumption can be extremely high.

Furthermore, fuel consumption in the four phases CT, CS, HT, and HS can be measured continuously.

Moreover, according to the hydrogen supply apparatus 1 of the third embodiment, since the measurement branch pipes 5, 6, 7 and 8 are provided with readily connected and disconnected connectors 30 between the pipes, the measurement hydrogen tanks T2, T3, T4 and T5 may be readily fitted and removed, thus improving ease of use. Furthermore, since the dummy unit 50 is provided with a female connector 54, the dummy unit 50 may be readily fitted and removed, thus improving ease of use.

Since the pressure regulators 21 are provided immediately downstream of the first valves 9A of the measurement branch pipes 5, 6, 7 and 8, the volume of the primary pressure piping wherein changes in pressure occur within the piping before and after measurement of the fuel consumption can be reduced. In other words, since all pressure variation within the piping downstream of the pressure regulators 21 can be prevented, errors in measurement due to variations in pressure within the piping can be reduced to an extremely low level.

[Fourth Embodiment]

Figure 15:
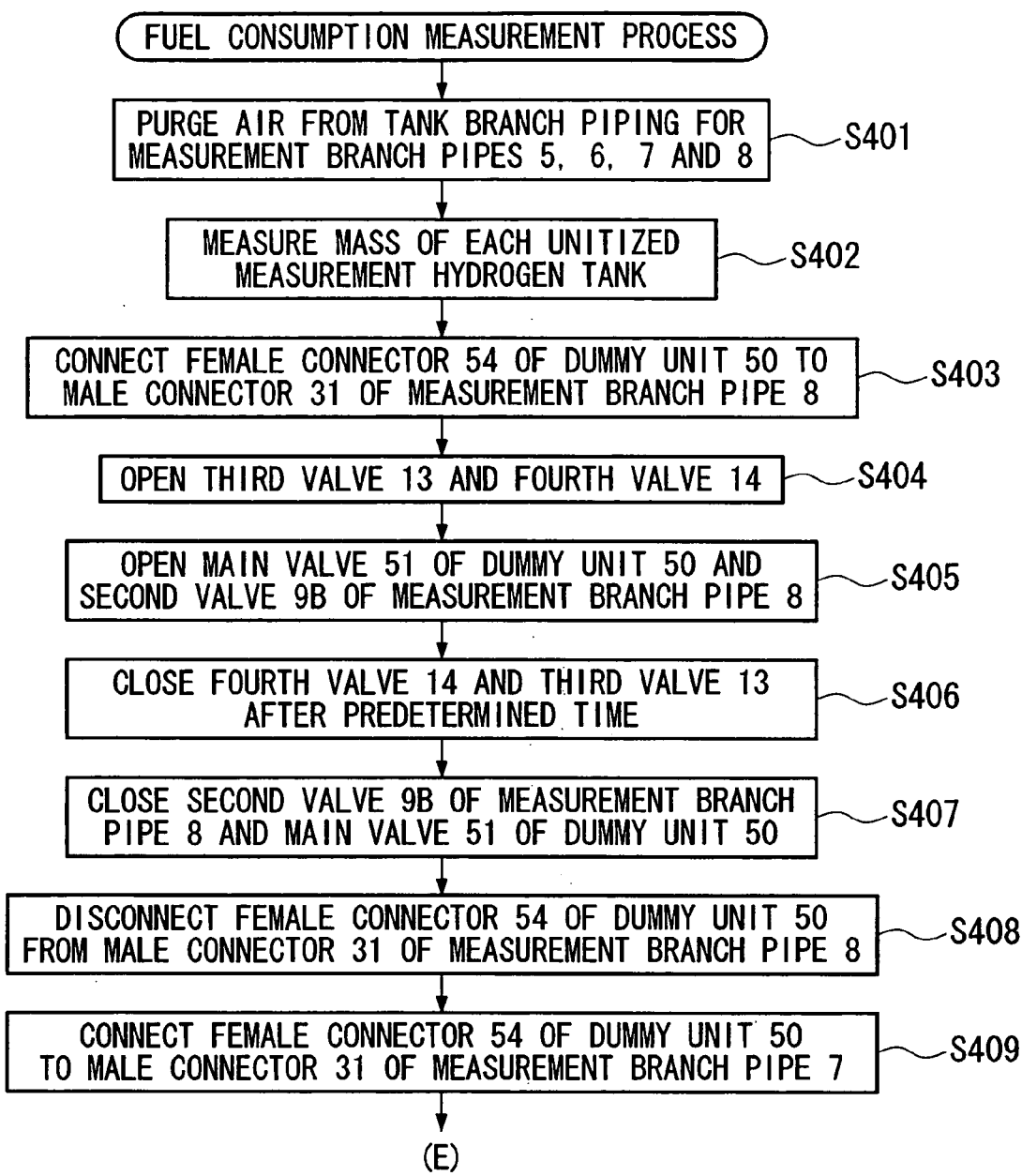
FIG. 15 is a flow chart showing a hydrogen supply method for measuring fuel consumption according to a fourth embodiment of the present invention (1 of 3).
Figure 16:
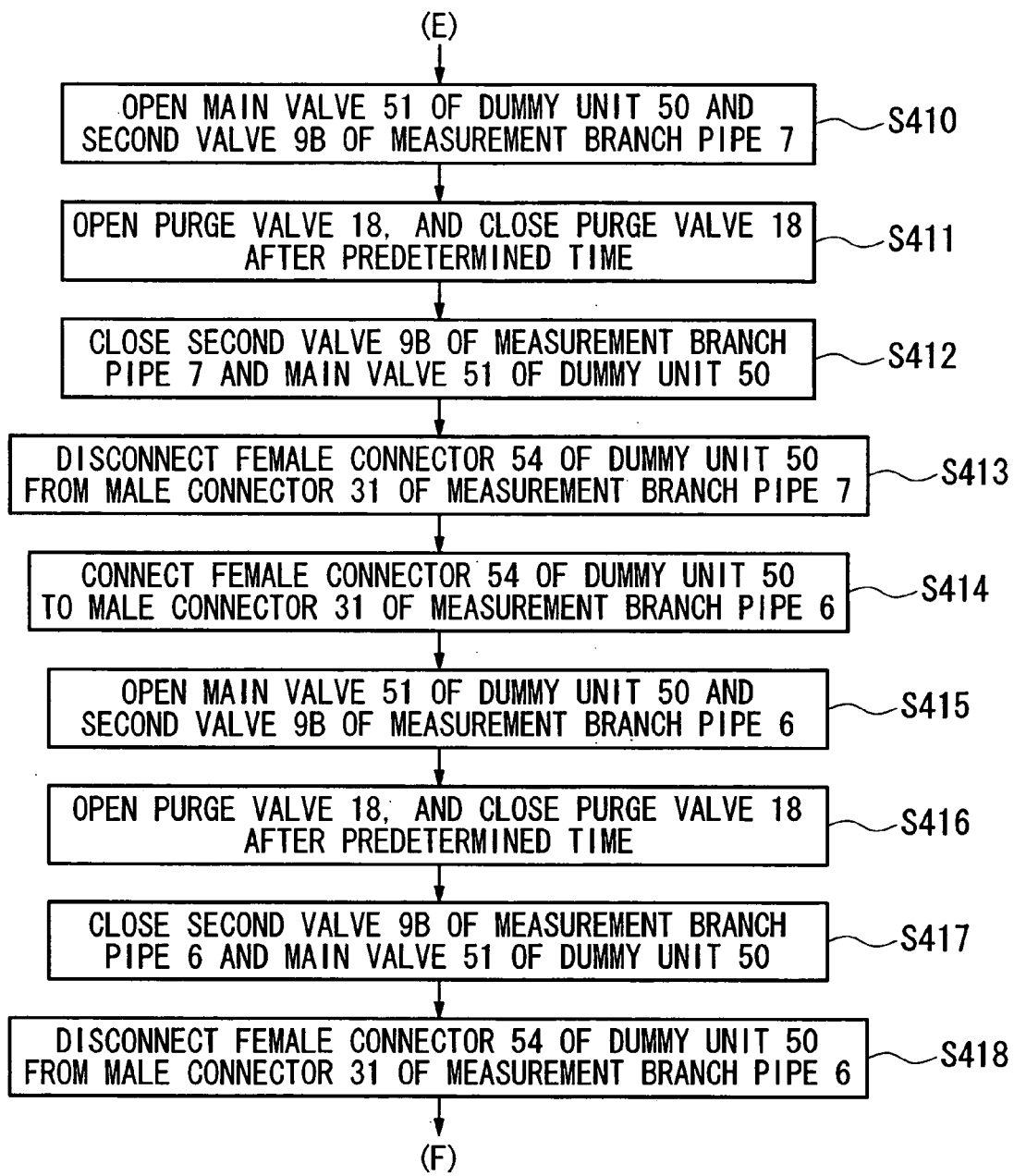
FIG. 16 is a flow chart showing the hydrogen supply method for measuring fuel consumption according to the fourth embodiment of the present invention (2 of 3).
Figure 17:
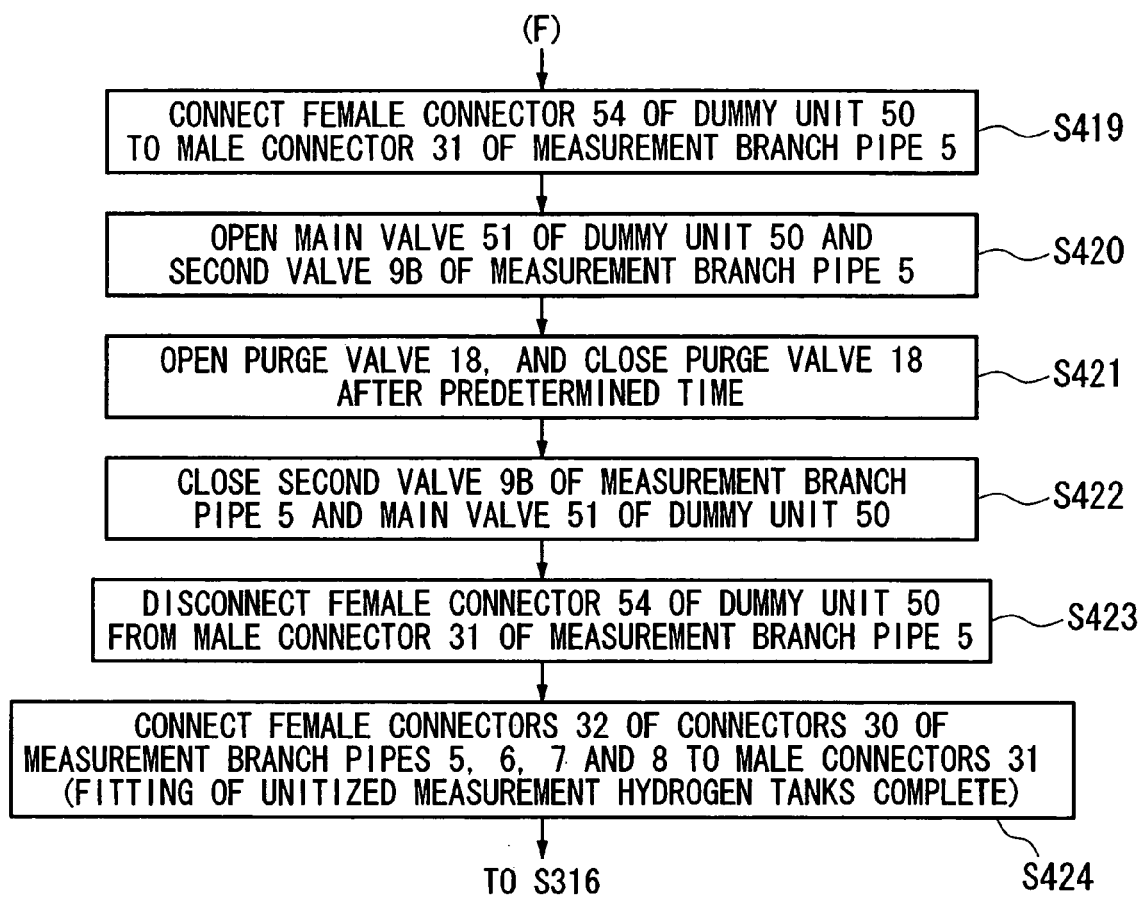
FIG. 17 is a flow chart showing the hydrogen supply method for measuring fuel consumption according to the fourth embodiment of the present invention (3 of 3).

A fourth embodiment of the present invention is explained with reference to FIG. 15 through FIG. 17.

Since the configuration of the hydrogen supply apparatus 1 of the fourth embodiment is exactly the same as that of the third embodiment, except for the fact that the air bleed adaptor 40B is unnecessary, the drawings of FIG. 9 and FIG. 11 are used and an explanation is omitted. Furthermore, in the fourth embodiment also, as with the third embodiment, the previously unitized measurement hydrogen tanks T2, T3, T4 and T5 are provided.

The differences between the fourth embodiment and the third embodiment are in the method for purging air from the piping of the hydrogen supply apparatus 1.

Hereunder the procedure for measuring fuel consumption in the fourth embodiment is explained with reference to the flow charts of FIG. 15 through FIG. 17. As in the first embodiment, the test vehicle V is provided with an external supply port (not shown in the drawing) to enable the supply of hydrogen to the fuel cell mounted in the vehicle from an external source. However the fourth valve 14 is not connected to the external supply port prior to the processing hereunder.

At first, as with the second embodiment, the air bleed adaptor 40A is used to purge air from the tank branch piping for the measurement branch pipes 5, 6, 7 and 8 of the unitized measurement hydrogen tanks T2, T3, T4 and T5 (step S401). Since the method of purging air from the tank branch piping is exactly the same as for the second embodiment explanation is omitted (refer to steps S201 through S205 in FIG. 8).

This air purge processing of the interior of the tank branch piping purges air within the measurement branch pipes 5, 6, 7 and 8 connected to the female connectors 32, and fills the piping with hydrogen adjusted to the measurement pressure Pt (approximately 0.9 MPa in this embodiment).

Next the mass of the unitized measurement hydrogen tanks T2, T3, T4 and T5 is measured (step S402). Measurement of the mass of the dummy hydrogen tank T1 is unnecessary.

The female connector 54 of the dummy unit 50 wherein the main valve 51 has been closed is then connected to the male connector 31 of the measurement branch pipe 8 connected to the main pipe 2 (step S403).

Then, the third valve 13 and the fourth valve 14 are opened to open the main pipe 2 to atmosphere (step S404). At this time, all the second valves 9B of the measurement branch pipes 5, 6, 7 and 8 are closed.

Next, the main valve 51 of the dummy unit 50 and the second valve 9B of the measurement branch pipe 8 connected to the main pipe 2 are opened, and hydrogen from the dummy hydrogen tank T1 is supplied to the main pipe 2 via the flexible tube 53 of the dummy unit 50 and the measurement branch pipe 8, and air within the piping is forced out by hydrogen and purged from the fourth valve 14 (step S405). Then when a time sufficient for the air within the measurement branch pipe 8 and the main pipe 2 downstream therefrom to be replaced with hydrogen (for example, approximately five seconds) has elapsed, the fourth valve 14 and the third valve 13 are closed (step S406). As a result, the measurement branch pipe 8 and the main pipe 2 downstream therefrom are filled with hydrogen at a measurement pressure Pt adjusted by the pressure regulator 52 of the dummy unit 50.

Next, the second valve 9B of the measurement branch pipe 8 and the main valve 51 of the dummy unit 50 are closed (step S407), and the female connector 54 of the dummy unit 50 is disconnected from the male connector 31 of the measurement branch pipe 8 (step S408). Since the non-return valves of the female connector 54 and the male connector 31 close when the female connector 54 of the dummy unit 50 is disconnected from the male connector 31 of the measurement branch pipe 8, the hydrogen from the dummy hydrogen tank T1 is not released to atmosphere from the female connector 54, and air does not enter the measurement branch pipe 8. Therefore the measurement branch pipe 8 is filled with hydrogen at the measurement pressure Pt and maintained in this condition.

Then the female connector 54 of the dummy unit 50 is connected to the male connector 31 of the measurement branch pipe 7 (step S409), and the second valve 9B of the measurement branch pipe 7 connected to the main valve 51 of the dummy unit 50 and the main pipe 2 is opened (step S410).

After this, the purge valve 18 is opened, hydrogen from the dummy hydrogen tank T1 is supplied to the main pipe 2 via the flexible tube 53 of the dummy unit 50 and the measurement branch pipe 7, air is forced out of this piping and purged from the purge valve 18, and the purge valve 18 is closed after a time sufficient for the air to be completely replaced with hydrogen (for example, approximately five seconds) (step S411). As a result, the measurement branch pipe 7 and the downstream main pipe 2 are filled with hydrogen at a measurement pressure Pt adjusted by the pressure regulator 52 of the dummy unit 50.

Next, the second valve 9B of the measurement branch pipe 7 and the main valve 51 of the dummy unit 50 are closed (step S412), and the female connector 54 of the dummy unit 50 is disconnected from the male connector 31 of the measurement branch pipe 7 (step S413). Since the non-return valve of the male connector 31 closes when the female connector 54 of the dummy unit 50 is disconnected from the male connector 31 of the measurement branch pipe 7, air does not enter the measurement branch pipe 7, and the measurement branch pipe 7 is filled with hydrogen at the measurement pressure Pt and maintained in this condition.

Then the female connector 54 of the dummy unit 50 is connected to the male connector 31 of the measurement branch pipe 6 (step S414), and the second valve 9B of the measurement branch pipe 6 connected to the main valve 51 of the dummy unit 50 and the main pipe 2 is opened (step S415).

After this, the purge valve 18 is opened, hydrogen from the dummy hydrogen tank T1 is supplied to the main pipe 2 via the flexible tube 53 of the dummy unit 50 and the measurement branch pipe 6, air is forced out of this piping and purged from the purge valve 18, and the purge valve 18 is closed after a time sufficient for the air to be completely replaced with hydrogen (for example, approximately five seconds) (step S416). As a result, the measurement branch pipe 6 and the downstream main pipe 2 are filled with hydrogen at a measurement pressure Pt adjusted by the pressure regulator 52 of the dummy unit 50.

Next, the second valve 9B of the measurement branch pipe 6 and the main valve 51 of the dummy unit 50 are closed (step S417), and the female connector 54 of the dummy unit 50 is disconnected from the male connector 31 of the measurement branch pipe 6 (step S418). Since the non-return valve of the male connector 31 closes when the female connector 54 of the dummy unit 50 is disconnected from the male connector 31 of the measurement branch pipe 6, air does not enter the measurement branch pipe 6, and the measurement branch pipe 6 is filled with hydrogen at the measurement pressure Pt and maintained in this condition.

Then the female connector 54 of the dummy unit 50 is connected to the male connector 31 of the measurement branch pipe 5 (step S419), and the second valve 9B of the measurement branch pipe 5 connected to the main valve 51 of the dummy unit 50 and the main pipe 2 is opened (step S420).

After this, purge valve 18 is opened, hydrogen from the dummy hydrogen tank T1 is supplied to the main pipe 2 via the flexible tube 53 of the dummy unit 50 and the measurement branch pipe 5, air is forced out of this piping and purged from the purge valve 18, and the purge valve 18 is closed after a time sufficient for the air to be completely replaced with hydrogen (for example, approximately five seconds) (step S421). As a result, the measurement branch pipe 5 and the downstream main pipe 2 are filled with hydrogen at a measurement pressure Pt adjusted by the pressure regulator 52 of the dummy unit 50.

Next, the second valve 9B of the measurement branch pipe 5 and the main valve 51 of the dummy unit 50 are closed (step S422), and the female connector 54 of the dummy unit 50 is disconnected from the male connector 31 of the measurement branch pipe 5 (step S423). Since the non-return valve of the male connector 31 closes when the female connector 54 of the dummy unit 50 is disconnected from the male connector 31 of the measurement branch pipe 5, air does not enter the measurement branch pipe 5, and the measurement branch pipe 5 is filled with hydrogen at the measurement pressure Pt and maintained in this condition.

Execution of the processing in steps S401 through S423 in this manner enables complete replacement of the contents of the entire main pipe 2 and the measurement branch pipes 5, 6, 7 and 8 connected to the main pipe 2 up to the male connector 31, with hydrogen at the measurement pressure Pt. Moreover, since this air purge processing uses only hydrogen from the dummy hydrogen tank T1, without using any hydrogen from the measurement hydrogen tanks T2, T3, T4 and T5, no errors in measurement of fuel consumption arise with consumption of hydrogen for purging of air, as explained later.

Next, the female connectors 32 of the unitized measurement hydrogen tanks T2, T3, T4 and T5 are connected to each of the male connectors 31 of the respective measurement branch pipes 5, 6, 7 and 8 connected to the main pipe 2 to thereby complete fitting of the measurement hydrogen tanks T2, T3, T4 and T5 to the hydrogen supply apparatus 1 (step S424).

Here, air purge processing of the interior of the tank branch piping for the measurement branch pipes 5, 6, 7 and 8 of the unitized measurement hydrogen tanks T2, T3, T4 and T5 is executed prior to connecting the male connectors 31 and the female connectors 32, and the interior is then filled with hydrogen at the measurement pressure Pt. Therefore, following connection of the connector 30, all piping of the hydrogen supply apparatus 1, except for the purge pipe 19, is filled with hydrogen at the measurement pressure Pt. This completes preparations for measuring fuel consumption.

Since the subsequent processing is exactly the same as the processing in step S316 and thereafter in the third embodiment, drawings and explanation are omitted.

Also with the hydrogen supply apparatus 1 and hydrogen supply method according to the fourth embodiment, as with the third embodiment, ease of use is improved, and continuous measurement of fuel consumption in each of the different phases is possible. Moreover, the effects and benefits of improving the accuracy of measurement of fuel consumption can be obtained.

[Other Embodiments]

This invention is not limited to the aforementioned embodiments.

For example, in each of the aforementioned embodiments, fuel consumption is measured in four phases (modes). However two, three, five, or more phases (modes) may be used, with measurement hydrogen tanks and the measurement branch pipes being provided corresponding to the number of number of phases (modes).

Moreover, the hydrogen fuel vehicle is not limited to a fuel cell vehicle, and may be a vehicle provided with a hydrogen engine.

Furthermore, valves may be opened and closed manually, or may be opened and closed automatically by computer according to a preset program.

As described above, according to the first aspect of the invention, the air remaining in the hydrogen supply piping can be purged, the hydrogen supply piping can be filled with hydrogen without the use of hydrogen from the measurement hydrogen tank, and the hydrogen from the measurement hydrogen tank can be used solely for measurement of fuel consumption. Therefore an excellent effect of improving the accuracy of measurement of fuel consumption is achieved.

According to the second aspect of the invention, the air in the measurement branch pipes can be diluted and purged with the hydrogen filling the main pipe without the use of hydrogen from the measurement hydrogen tanks, and the air purge processing can be multiply repeated as necessary to increase the concentration of hydrogen in the main pipe and the measurement branch pipes to a predetermined concentration, and the hydrogen from the measurement hydrogen tanks can be used solely for measurement of fuel consumption. Therefore an excellent effect of improving the accuracy of measurement of fuel consumption is achieved.

According to the third aspect of the invention, the air in the main pipe and the measurement branch pipe can be purged from the piping using the hydrogen from the dummy hydrogen tank, and these pipes can be filled with the hydrogen from the dummy hydrogen tank, and the hydrogen from the measurement hydrogen tank can be used solely for measurement of fuel consumption. Therefore an excellent effect of improving the accuracy of measurement of fuel consumption is achieved.

According to the fourth aspect of the invention, hydrogen can be continuously supplied to the hydrogen fuel vehicle by simply switching between the measurement hydrogen tanks, when measuring fuel consumption in different running modes (phases). Therefore an excellent effect of enabling continuous measurement of fuel consumption is achieved.

According to the fifth aspect of the invention, the measurement hydrogen tanks and dummy hydrogen tank may be readily connected and disconnected. Therefore an excellent effect of improving ease of use is achieved.

According to the sixth aspect of the invention, the reduction in pressure in the piping associated with reduction in pressure in the measurement hydrogen tanks following measurement of fuel consumption, can be held solely in the main pipe and measurement branch pipes upstream of the pressure regulator, and hence a reduction in pressure in the main pipe downstream of the pressure regulator can be prevented. Therefore an excellent effect of enabling a reduction in errors of measurement of fuel consumption resulting from changes in hydrogen pressure before and after measurement of fuel consumption is achieved.

According to the seventh aspect of the invention, the reduction in pressure in the piping associated with reduction in pressure in the measurement hydrogen tanks following measurement of fuel consumption, can be held solely in each measurement branch pipe upstream of each pressure regulator, and hence a reduction in pressure in the measurement branch pipes and the main pipe downstream of each pressure regulator can be prevented. Therefore an excellent effect of enabling a reduction in errors of measurement of fuel consumption resulting from changes in hydrogen pressure before and after measurement of fuel consumption is achieved.

What is claimed is:

1. A hydrogen supply method for measuring fuel consumption of a hydrogen fuel vehicle comprising the steps of:
   supplying hydrogen from a dummy hydrogen tank to hydrogen supply piping connecting a measurement hydrogen tank and said hydrogen fuel vehicle, to purge air in said hydrogen supply piping, prior to supplying hydrogen from a measurement hydrogen tank to said hydrogen fuel vehicle; and
   supplying hydrogen from said measurement hydrogen tank to said hydrogen fuel vehicle via said hydrogen supply piping after filling of the hydrogen supply piping with hydrogen from said dummy hydrogen tank.

2. A hydrogen supply method for measuring fuel consumption of a hydrogen fuel vehicle using a hydrogen supply apparatus with a plurality of measurement branch pipes connected to main piping connected to said hydrogen fuel vehicle, and measurement hydrogen tanks connected to each of the measurement branch pipes, comprising the steps of:
   performing air purge processing to purge air in said main pipe and said measurement branch pipes and replace with hydrogen, prior to supply of hydrogen from said measurement hydrogen tanks to said hydrogen fuel vehicle,
   wherein, said air purge processing comprising; a first step for pressurizing said main pipe with hydrogen from a dummy hydrogen tank with said main pipe closed off from said measurement branch pipes, a second step for closing off said dummy hydrogen tank from said main pipe following said first step, and making said main pipe and said measurement branch pipes continuous, and mixing the hydrogen in the main pipe and the air in the measurement branch pipes, and a third step for discharging the gas mixed in said second step from the piping, and
   supplying the hydrogen from said measurement hydrogen tanks to said hydrogen fuel vehicle via said main pipe and said measurement branch pipes, after performing said air purge processing.

3. A hydrogen supply apparatus for measuring fuel consumption of a hydrogen fuel vehicle comprising:
   a main pipe connected to said hydrogen fuel vehicle;
   a measurement tank filled with hydrogen for measurement;
   a dummy hydrogen tank filled with hydrogen for dummy use;
   a measurement branch pipe having an opening/closing device which connects said main pipe and said measurement hydrogen tank, and
   a dummy branch pipe having an opening/closing device which connects said main pipe and said dummy hydrogen tank.

4. A hydrogen supply apparatus for measuring fuel consumption of a hydrogen fuel vehicle according to claim 3, wherein said measurement hydrogen tank is multiply provided, and said measurement hydrogen tanks are connected in parallel to said main pipe via each of said measurement branch pipes.

5. A hydrogen supply apparatus for measuring fuel consumption of a hydrogen fuel vehicle according to claim 4, wherein said measurement branch pipe and said dummy branch pipe are releasably connected by a connector fitted with an automatic open/close mechanism that automatically opens and closes when the connector is fitted or removed, which is provided therebetween to enable separation and connection as necessary.

6. A hydrogen supply apparatus for measuring fuel consumption of a hydrogen fuel vehicle according to claim 5, wherein a pressure regulator is provided in said main pipe downstream of a connection loacated furthest downstream of the connections between said measurement branch pipes and said dummy branch pipe, and said main pipe.

7. A hydrogen supply apparatus for measuring fuel consumption of a hydrogen fuel vehicle according to claim 5, wherein a pressure regulator is provided for each of a plurality of said measurement branch pipes.

8. A hydrogen supply apparatus for measuring fuel consumption of a hydrogen fuel vehicle according to claim 4, wherein a pressure regulator is provided in said main pipe downstream of a connection located furthest downstream of the connections between said measurement branch pipes and said dummy branch pipe, and said main pipe.

9. A hydrogen supply apparatus for measuring fuel consumption of a hydrogen fuel vehicle according to claim 4, wherein a pressure regulator is provided for each of a plurality of said measurement branch pipes.

10. A hydrogen supply apparatus for measuring fuel consumption of a hydrogen fuel vehicle according to claim 3, wherein said measurement branch pipe and said dummy branch pipe are releasably connected by a connector fitted with an automatic open/close mechanism that automatically opens and closes when the connector is fitted or removed, which is provided therebetween to enable separation and connection as necessary.

11. A hydrogen supply apparatus for measuring fuel consumption of a hydrogen fuel vehicle according to claim 10, wherein a pressure regulator is provided in said main pipe downstream of a connection located furthest downstream of the connections between said measurement branch pipes and said dummy branch pipe, and said main pipe.

12. A hydrogen supply apparatus for measuring fuel consumption of a hydrogen fuel vehicle according to claim 10, wherein a pressure regulator is provided for each of a plurality of said measurement branch pipes.

13. A hydrogen supply apparatus for measuring fuel consumption of a hydrogen fuel vehicle according to claim 3, wherein a pressure regulator is provided in said main pipe downstream of a connection located furthest downstream of the connections between said measurement branch pipes and said dummy branch pipe, and said main pipe.

* * * * *